(12) United States Patent
Sano et al.

(10) Patent No.: US 6,789,338 B2
(45) Date of Patent: Sep. 14, 2004

(54) REMOTE CONTROLLER OF BIPED ROBOT

(75) Inventors: Shigeo Sano, Wako (JP); Toru Takenaka, Wako (JP); Takayuki Kawai, Wako (JP); Yuichi Yoshida, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/416,990

(22) PCT Filed: Nov. 16, 2001

(86) PCT No.: PCT/JP01/10032
§ 371 (c)(1),
(2), (4) Date: Jun. 12, 2003

(87) PCT Pub. No.: WO02/40227
PCT Pub. Date: May 23, 2002

(65) Prior Publication Data
US 2004/0056625 A1 Mar. 25, 2004

(30) Foreign Application Priority Data
Nov. 17, 2000 (JP) .................................... 2000-351753

(51) Int. Cl.⁷ .................................................. B25J 5/00
(52) U.S. Cl. .............................. 38/568.12; 318/568.11; 318/568.17
(58) Field of Search ................... 378/568.12, 568.11, 378/568.17; 700/245; 901/34

(56) References Cited

U.S. PATENT DOCUMENTS 6,532,400 B1 * 3/2003 Jacobs ......................... 700/245
6,650,975 B2 * 11/2003 Ruffner ......................... 701/23

FOREIGN PATENT DOCUMENTS

| JP | 08-216066 | 8/1996 |
| JP | 10-086081 | 4/1998 |
| JP | 10-217161 | 8/1998 |

* cited by examiner

Primary Examiner—Karen Masih
(74) Attorney, Agent, or Firm—Rankin, Hill, Porter & Clark LLP

(57) ABSTRACT

A remote controller for a biped robot is of a simple arrangement capable of remotely controlling movement of the biped robot while taking into account the stability of the attitude of the robot. A manipulation unit 23 outputs, to a robot A, signals representative of manipulated positions of manipulator levers 26, 26 which correspond respectively to both legs 2, 2 of the robot A. A control unit 19 mounted in the robot A generates a motion command (desired gait) for determining motions of the legs for at least two steps of a walking action of the robot A depending on the manipulated positions of manipulator levers 26, 26 which are represented by output signal data from the manipulation unit 23, and controls motions of the legs 2, 2 based on the motion command.

7 Claims, 14 Drawing Sheets

FIG. 3
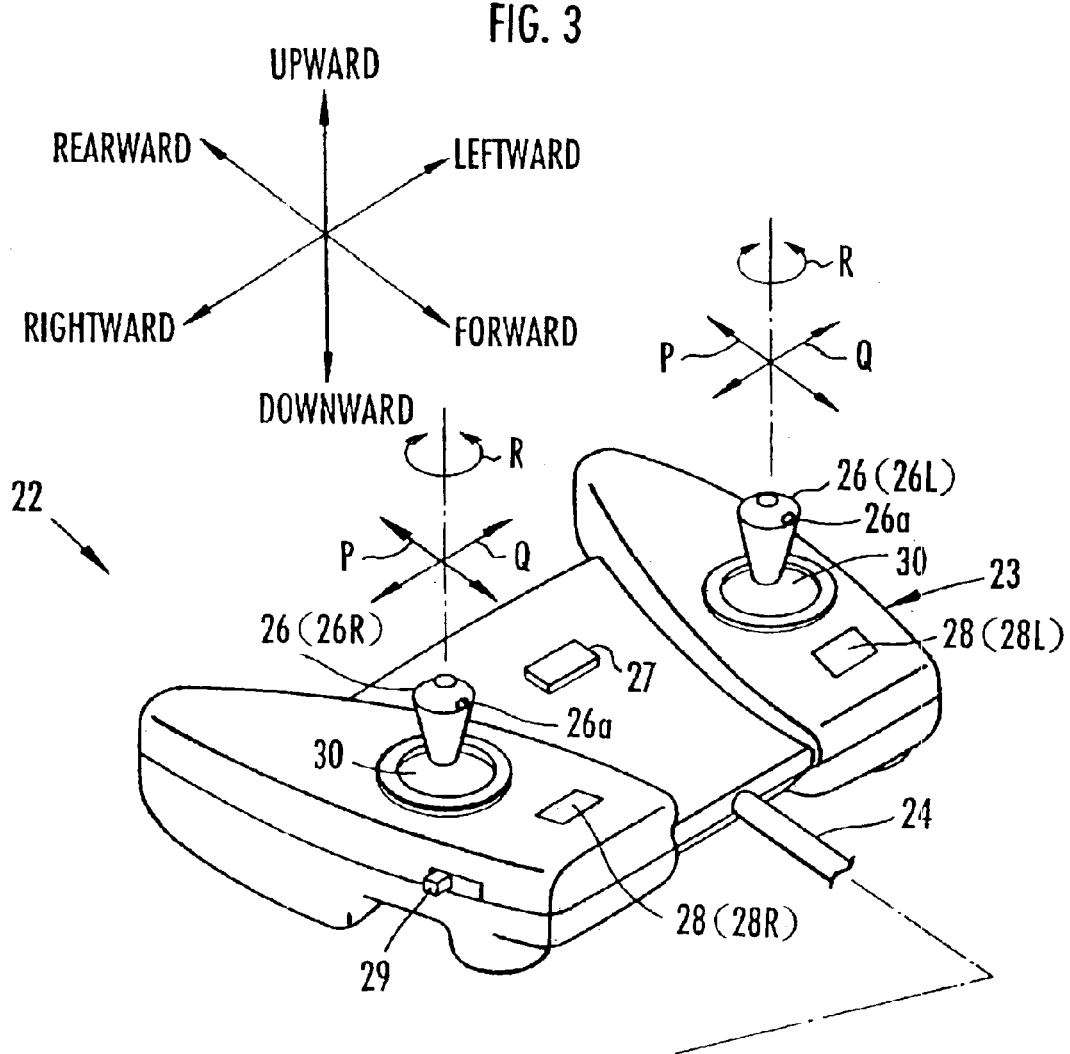
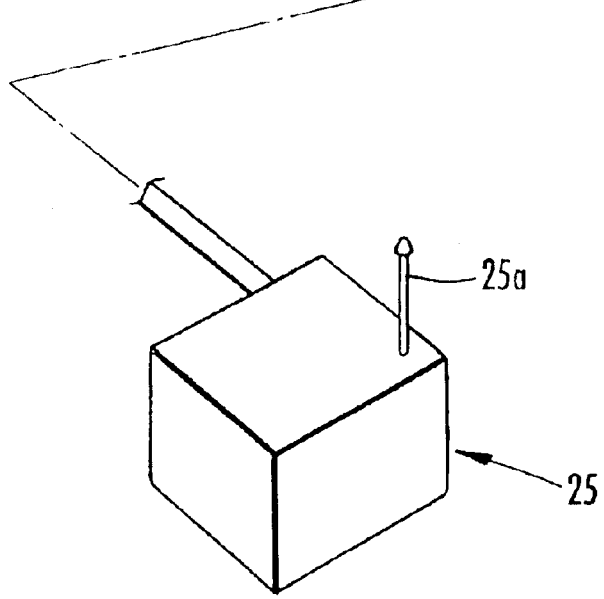

LEFT MANIPULATOR LEVER : FORWARD
RIGHT MANIPULATOR LEVER : FORWARD

LEFT MANIPULATOR LEVER : FORWARD
RIGHT MANIPULATOR LEVER : NEUTRAL

LEFT MANIPULATOR LEVER : FORWARD
RIGHT MANIPULATOR LEVER : REARWARD

LEFT MANIPULATOR LEVER : NEUTRAL
RIGHT MANIPULATOR LEVER : FORWARD

FIG. 9 (a)
LEFT MANIPULATOR
LEVER : RIGHTWARD
RIGHT MANIPULATOR
LEVER : RIGHTWARD
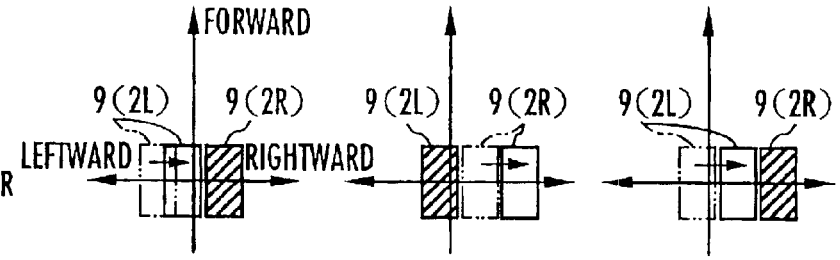
FIG. 9 (b)
LEFT MANIPULATOR
LEVER : RIGHTWARD
RIGHT MANIPULATOR
LEVER : NEUTRAL
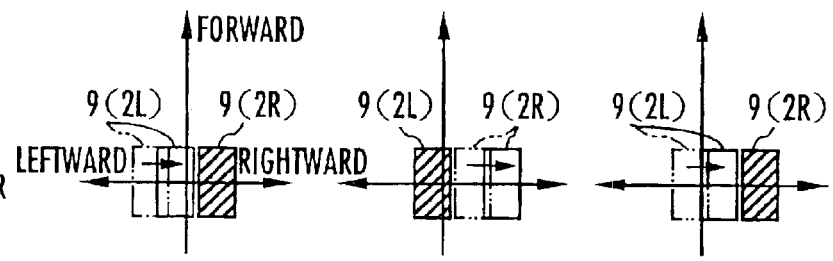
FIG. 9 (c)
LEFT MANIPULATOR
LEVER : RIGHTWARD
RIGHT MANIPULATOR
LEVER : LEFTWARD
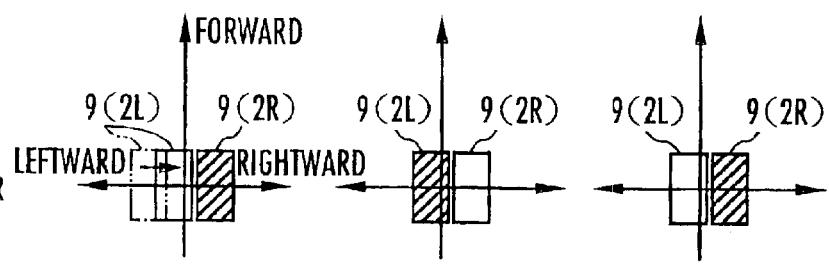
FIG. 9 (d)
LEFT MANIPULATOR
LEVER : NEUTRAL
RIGHT MANIPULATOR
LEVER : RIGHTWARD
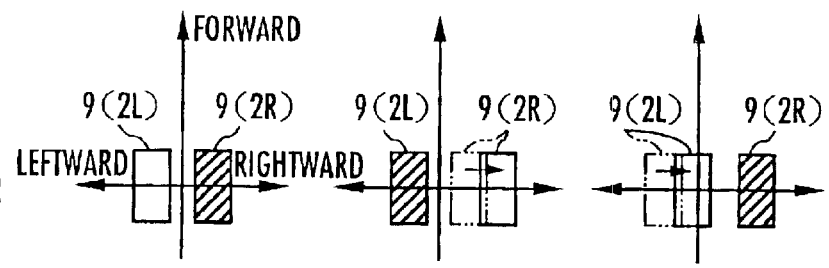

LEFT MANIPULATOR
LEVER : TURNED RIGHTWARD
RIGHT MANIPULATOR
LEVER : TURNED RIGHTWARD

LEFT MANIPULATOR
LEVER : TURNED RIGHTWARD
RIGHT MANIPULATOR
LEVER : NEUTRAL

LEFT MANIPULATOR
LEVER : TURNED RIGHTWARD
RIGHT MANIPULATOR
LEVER : TURNED LEFTWARD

LEFT MANIPULATOR
LEVER : NEUTRAL
RIGHT MANIPULATOR
LEVER : TURNED RIGHTWARD

LEFT MANIPULATOR LEVER : FORWARD
RIGHT MANIPULATOR LEVER : FORWARD

LEFT MANIPULATOR LEVER : FORWARD
RIGHT MANIPULATOR LEVER : NEUTRAL

LEFT MANIPULATOR LEVER : FORWARD
RIGHT MANIPULATOR LEVER : REARWARD

LEFT MANIPULATOR LEVER : NEUTRAL
RIGHT MANIPULATOR LEVER : FORWARD

LEFT MANIPULATOR LEVER : FORWARD & LEFTWARD & TURNED LEFTWARD
RIGHT MANIPULATION : NEUTRAL

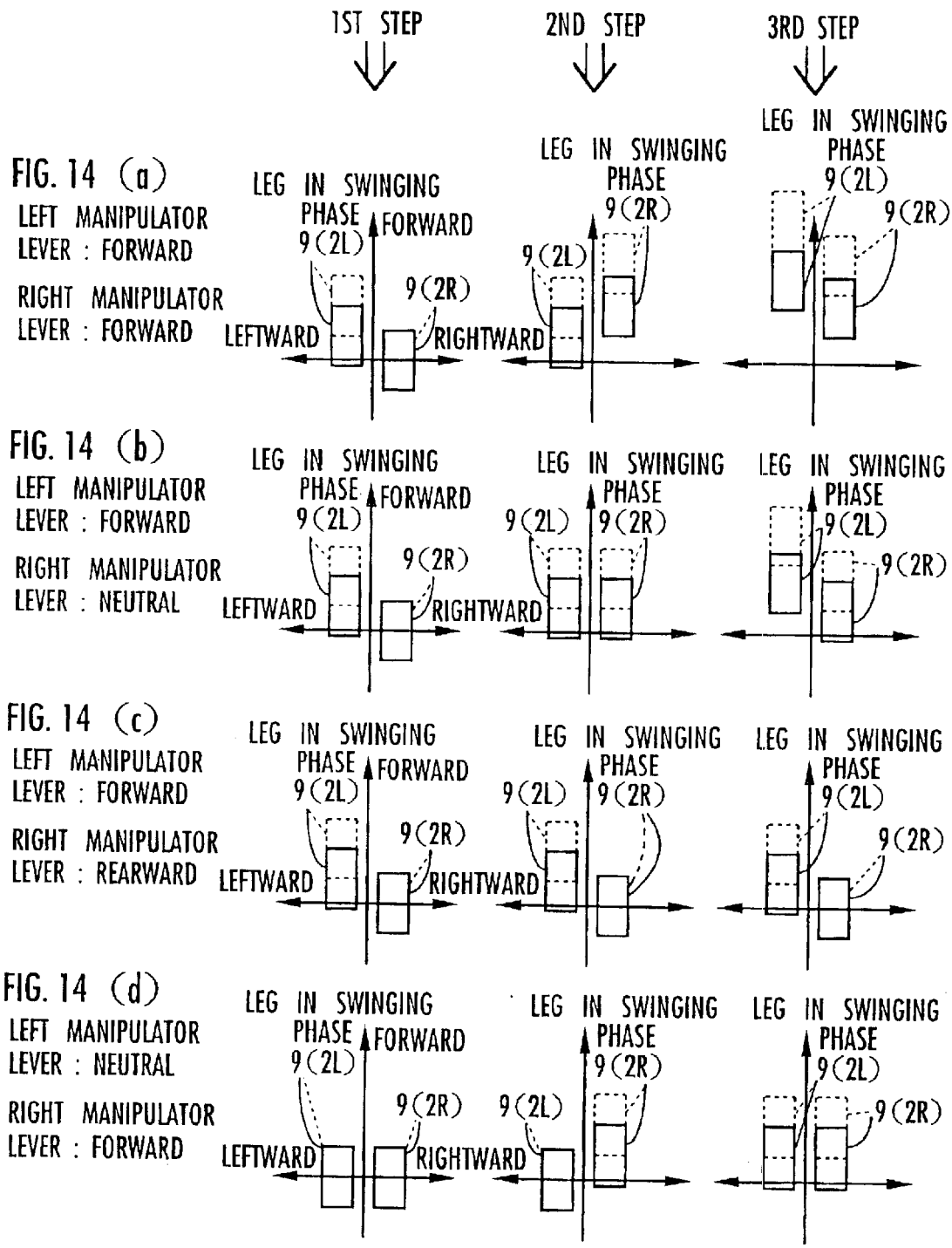

REMOTE CONTROLLER OF BIPED ROBOT

TECHNICAL FIELD

The present invention relates to a remote controller for a biped robot.

BACKGROUND ART

Biped robots which attempts have been made in recent years to put to practical use by the applicant of the present application and others have two legs extending from an upper body. Like humans, the biped robot moves by making a walking action to lift and place the two legs. In the present specification, the "movement" of the biped robot covers motion from one place to another and also turning in substantially the same position to change the direction of the robot, for example.

For moving a biped robot, it is the general practice to teach a control apparatus for controlling the robot according to an algorithm which determines the pattern of a walking action that the robot is going to make (an algorithm which determines what walking action is to made at which timing).

This process of teaching the control apparatus according to such an algorithm requires a lot of time and labor for carrying out the teaching sequence. According to the process, it is difficult to control the robot to make various walking actions freely.

One solution is to instruct the control apparatus in a desired walking action for the robot under remote control with a remote controller or the like.

Unlike industrial robots that are installed at site, biped robots are intrinsically susceptible to disturbances and tend to lose attitude stability. Therefore, it is necessary to construct a robot control system that is designed taking into account the attitude stability of the robot.

It is also known in the art that the walking action of a robot is controlled by a so-called master-slave system. However, a biped robot control apparatus based on such a master-slave system is large in scale and complex in structure because the operator itself is required to make an action which is identical to a walking action that the manipulating person wants the robot to make.

The present invention has been made in view of the above background. It is an object of the present invention to provide a remote controller of simple arrangement for remotely controlling a biped robot to move while taking into account the attitude stability of the biped robot.

DISCLOSURE OF THE INVENTION

To achieve the above object, there is provided in accordance with the present invention a remote controller for a biped robot which moves in a walking action by alternately lifting and placing two legs, characterized by comprising a manipulation unit having a manipulator lever shiftable to a plurality of manipulated positions, for outputting a signal representing a manipulated position of the manipulator lever, and control means for being supplied with output signal data from the manipulation unit, generating a motion command for determining motions of the legs for at least two steps of the walking action of the robot depending on the manipulated position of the manipulator lever which is represented by the supplied output signal data, and controlling motions of the legs based on the motion command.

According to the present invention, the control means generates motion commands for the legs of the robot depending on the manipulated position of the manipulator lever, and controls motions of the legs based on the motion command. Therefore, it is possible to enable the robot to make a plurality of types of patterns of walking actions (e.g., forward movement, turning, lateral walking, etc.) by manipulating the manipulator levers. Since the motion command is generated for at least two steps of the walking action of the robot, a walking action pattern for at least two steps of the robot can be indicated by the manipulated position of the manipulator lever of the manipulation unit. Thus, the control means can generate the motion command while keeping the center of gravity of the robot in a position appropriate for maintaining the stable attitude of the robot.

According to the present invention, therefore, it is possible to remotely control movement of the biped robot while taking into account the stability of the attitude of the robot.

According to the present invention, more specifically, the motion command for determining motions of the legs for at least two steps represents a desired gait for two steps which comprises a current time gait for determining motions of the legs from a two-leg support period in which both the legs are placed until a next two-leg support period, and a next time gait for determining motions of the legs from the next two-leg support period until a two-leg support period next to the next. Each time a two-leg support period is reached, said control means obtains a next time gait immediately prior to the dual support base as a current time gait, generates a new next time gait depending on the manipulated position of said two-leg support period manipulator lever, and sequentially adjusts at least the new next time gait depending on the manipulated position of the manipulator lever.

With the above arrangement, while moving the legs of the robot based on the current time gait from each two-leg support period to a next two-leg support period, the next time gait from the next two-leg support period until the two-leg support period next to the next two-leg support period is generated. When the motion of the legs of the robot based on the current time gait is completed and the next two-leg support period is reached, the next time gait generated immediately prior to the next two-leg support period becomes the current time gait from the next two-leg support period. By thus generating a current time gait and a next time gait as a desired gait for two steps, it is possible to cause the robot to make a walking action while avoiding an abrupt shifting of the center of gravity of the robot and reliably maintaining the stability of the attitude of the robot.

Preferably, according to the present invention, the manipulation unit has manipulator levers associated respectively with the legs of said robot, and said control means generates said motion command for determining a relative placed position and/or attitude of the free leg with respect to the supporting leg, depending on the manipulated position of the manipulator lever which is represented by said output signal data with respect to the manipulator lever corresponding to the free leg in said walking action.

With the above arrangement, depending on the manipulated position of the manipulator lever corresponding to one of the two legs of the robot, a motion of the one leg is determined when the robot walks one step with the one free leg (the one leg is lifted and placed), and depending on the manipulated position of the manipulator lever corresponding to the other leg, a motion of the other leg is determined when the robot walks one step with the other free leg (the other leg is lifted and placed). That is, it is possible to indicate, to the control means, motions of the legs for two steps of the walking action of the robot by manipulating the manipulator levers which correspond respectively to the legs. The control means can thus generate the motion command so as to match the manipulated positions of the manipulator levers, so that the matching between the manipulation of the manipulation unit and the actual walking action of the robot is increased.

Preferably, according to the present invention, said plurality of manipulated positions include a movement stopping manipulated position for stopping movement of said biped robot, and said control means selectively generates a motion command for causing said legs to make a stepping action and a motion command for keeping said legs in a placed state, depending on a predetermined condition, when said manipulator lever is shifted to said movement stopping manipulated position.

With the above arrangement, when the manipulator lever is shifted to the movement stopping manipulated position, the legs make a stepping action or are kept in the placed state without moving the robot. While in the stepping action, the robot can smoothly start moving in a walking action when the manipulator lever is shifted from the movement stopping manipulated position to another manipulated position. While the legs are kept in the placed state, the consumption of electric energy by the robot can be reduced.

The predetermined condition for determining whether the legs are to make a stepping action or to be kept in the placed state may be indicated to the control means by the operator, using a switch on the manipulation unit. Alternatively, for example, the residual capacity of an electric energy storage device for operating the robot may be monitored, and the control means may automatically select the predetermined condition depending on the monitored residual capacity.

Preferably, according to the present invention, said plurality of manipulated positions include a predetermined neutral manipulated position, and said control means comprises means for recognizing a displacement of said manipulator lever from said neutral manipulated position to other one of the manipulated positions and/or a time-dependent rate of change of the displacement, based on the output signal data from said manipulation unit, said control means generating said motion command to adjust a displacement or a moving speed of said biped robot depending on the recognized displacement and/or time-dependent rate of change of the displacement.

If the manipulated positions include the movement stopping manipulated position as described above, then the movement stopping manipulated position and the neutral manipulated position may be the same manipulated position.

With the above arrangement, by adjusting the displacement of the manipulator lever from the neutral manipulated position and the rate of change of the displacement (the moving speed of the manipulator), it is possible to adjust the displacement (stride) and the moving speed of the biped robot, thus increasing the manipulability of the robot with the manipulation unit.

Preferably, according to the present invention, the remote controller further has placing detecting means for detecting when at least one of the legs is placed from a lifted state and outputting a detected signal to said manipulation unit, said manipulation unit having indicating means for indicating the placing of said at least one of the legs depending on the detected signal.

With the above arrangement, the operator of the manipulation unit can recognize the timing of the placing of each of the legs of the robot based on an indication from the indicating means, and hence can properly manipulate the manipulator lever so as to match the actual motion of the robot.

Preferably, according to the present invention, furthermore, said control means is arranged to generate a plurality of different types of said motion commands with respect to at least some of said plurality of manipulated positions, said manipulation unit having manipulation mode designating means for selectively indicating the types of the motion commands to be generated by said control means, to said control means.

With the above arrangement, the manipulation mode designating means can change a plurality of types of patterns of the walking action of the robot depending on the manipulation of the manipulation unit. Therefore, the operator of the manipulation unit can manipulate the walking action of the robot according to a manipulation pattern (manipulation mode) of the manipulation unit which matches the operator's preferences.

The plurality of manipulated positions include a manipulated position for moving the robot in the fore-and-aft direction, a manipulated position for moving the robot in the lateral direction, and a manipulated position for moving the robot in the rotational direction.

BRIEF DESCRIPTION OF THE DRAWINGS

FIG. 3 is a perspective view of major components of a remote controller for the robot shown in FIGS. 1 and 2;

FIGS. 7 through 13 are diagrams illustrative of leg actions of the robot according to the first embodiment of the present invention; and FIGS. 14(a) through 14(d) are diagrams illustrative of leg actions of a robot according to a second embodiment of the present invention.

BEST MODE FOR CARRYING OUT THE INVENTION

A remote controller for a biped robot according to a first embodiment of the present invention will be described below with reference to FIGS. 1 through 13.

Figure 1:
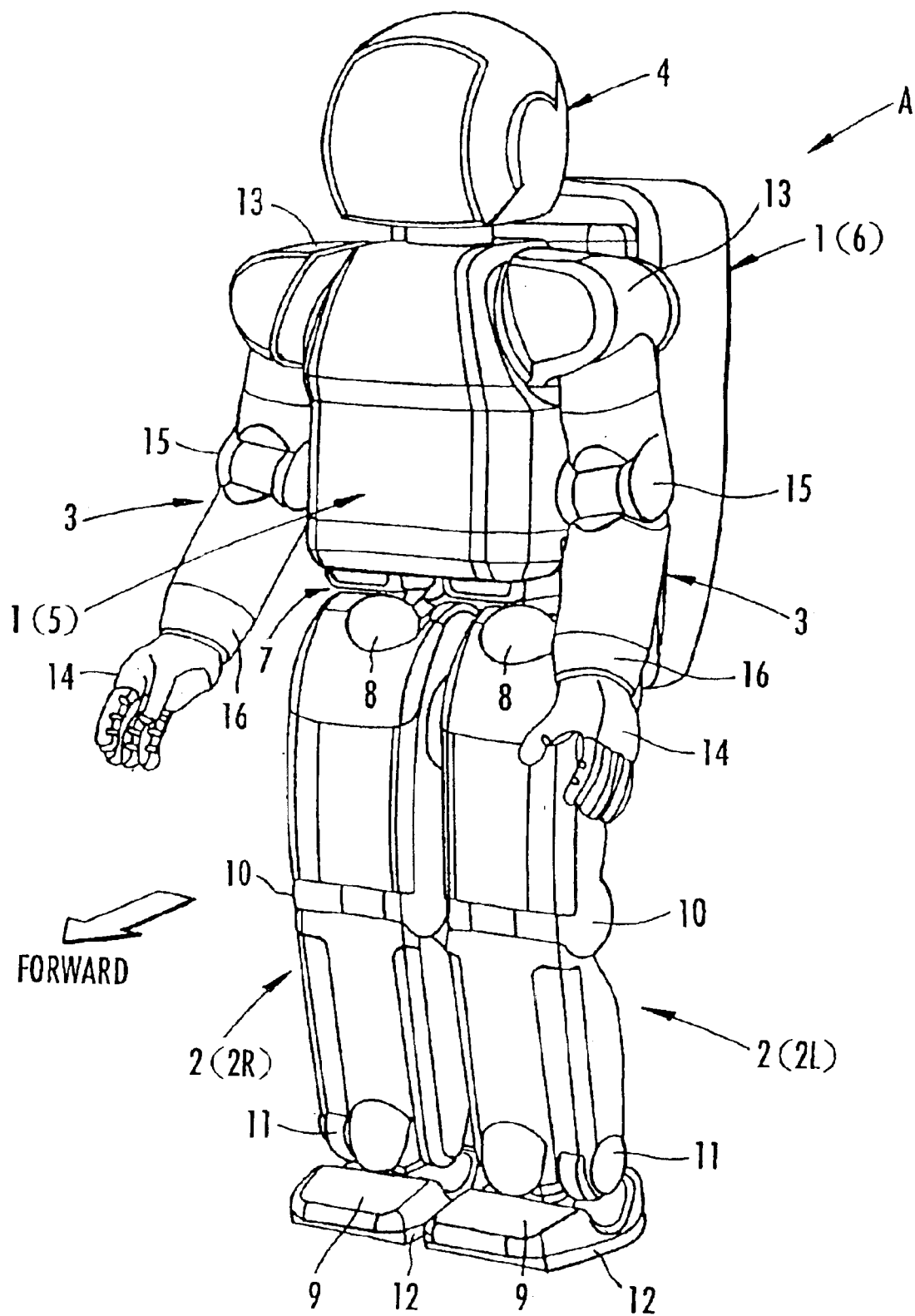
FIGS. 1 and 2 are perspective and side elevational views, respectively, of a biped robot according to a first embodiment of the present invention.
Figure 2:
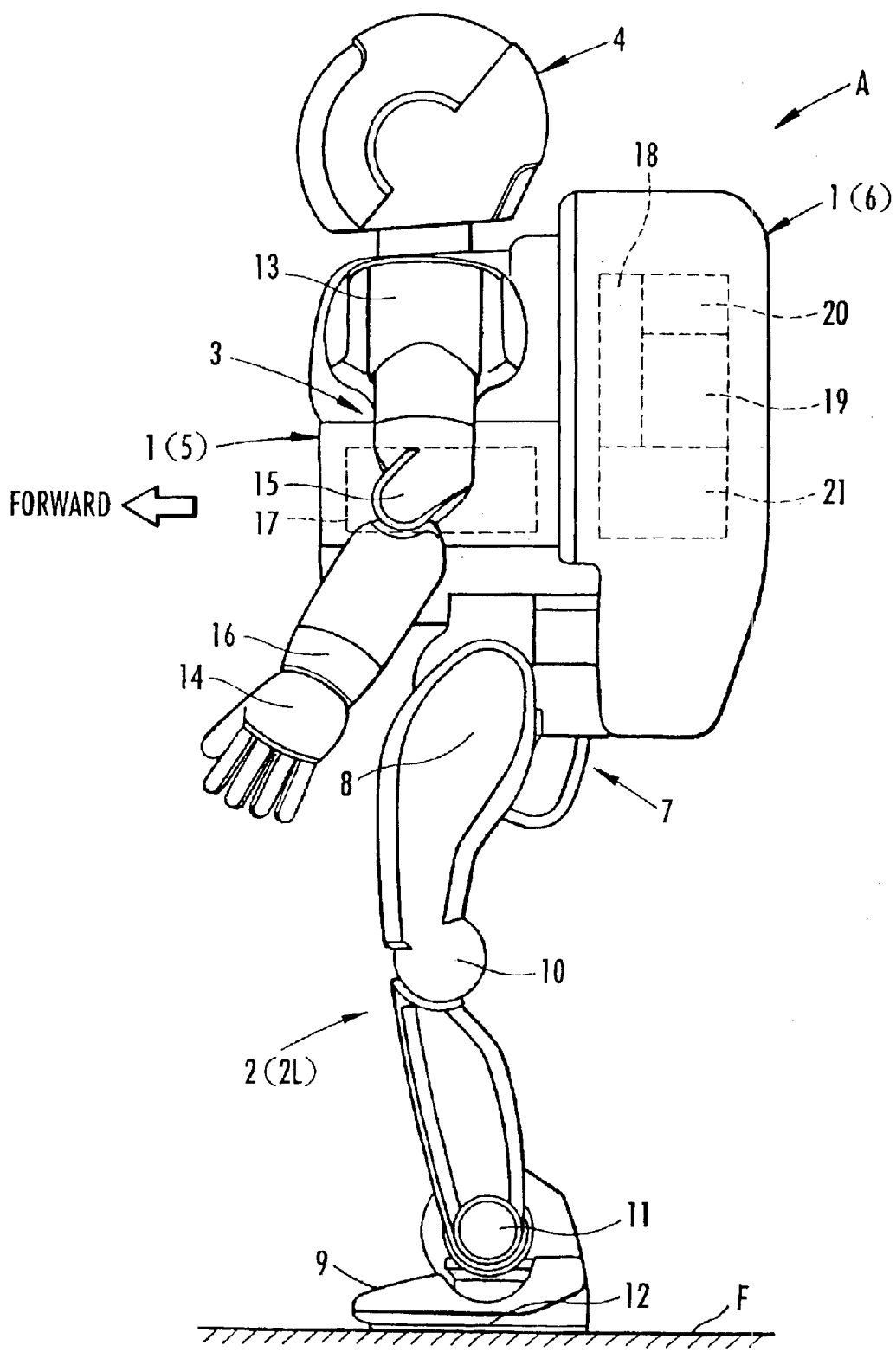

As shown in FIGS. 1 and 2, a biped robot A according to the present embodiment comprises a human-shaped robot having an upper body 1 (torso), a pair of left and right legs 2, 2, a pair of left and right arms 3, 3, and a head 4.

The upper body 1 of the robot A comprises a main body 5 from which the legs 2, 2 and the arms 3, 3 extend and which supports the head 4 thereon, and a box-shaped auxiliary body 6 mounted on the back of the main body 5 so as to be shouldered thereon.

A hip 7 is provided on the lower end of the main body 5. The legs 2 extend respectively from a pair of left and right hip joints 8, 8 disposed in the hip 7. Each of the legs 2 has a knee joint 10 and an ankle joint 11 disposed between a foot 9 thereof and the hip joint 8 and arranged successively from the hip joint 8.

Each of the hip joints 8 can rotate about three axes which extend vertically (in a pitch direction), laterally (in a roll direction), and sagitally (in a yaw direction), respectively.

The knee joint 10 can rotate about one axis which extends laterally. The ankle joint 11 can rotate about two axes which extend vertically and laterally, respectively. With these rotatable joints, each of the legs 2 can move substantially in the same manner as with the human leg. A ground sensor 12 for outputting a signal when the foot 9 is placed on a floor F (see FIG. 2) is mounted on the sole of the foot 9 of each of the legs 2. The ground sensor 12 corresponds to a placing detecting means according to the present invention, and comprises a pressure sensor or the like, for example. The placing detecting means may alternatively comprise a sensor (to be described later on) for detecting a load and a moment acting on the foot 9.

Shoulder joints 13 are provided on respective left and right sides of an upper portion of the main body 5. The arms 3 extend from the respective shoulder joints 13. Each of the arms 3 has an elbow joint 15 and a wrist joint 16 disposed between a hand 14 thereof and the shoulder joint 13 and arranged successively from the shoulder joint 13. The shoulder joint 13, the elbow joint 15, and the wrist joint 16 can rotate about three axes, one axis, and one axis, respectively, making it possible to move each arm 3 substantially in the same manner as with the human arm.

The joints of the legs 2 and the arms 3 are actuated by electric motors, not sown. The head 4 is supported on an upper end of the main body 5, and houses therein an imaging device (not shown) for vision of the robot A.

As shown in FIG. 2, an electric energy storage device 17 serving as a power supply for moving the robot A is mounted in the main body 5. The auxiliary body 6 houses therein a driver circuit unit 18 for the electric motors (not shown) which actuate the joints of the legs 2 and the arms 3, a control unit 19 (hereinafter referred to as "ECU 19") for controlling movements of the robot A (controlling movements of the joints of the legs 2 and the arms 3), a communication device 20 for exchanging various pieces of information between the ECU 19 and a remote controller 22, to be described later on, and a DC/DC converter 21 for converting the level of the output voltage of the electric energy storage device 17 into the level of a voltage for energizing the above electric motors. The ECU 19 comprises an electronic circuit including a microcomputer, and corresponds to a control means according to the present invention. In the present embodiment, the communication device 20 carries out wireless communications.

Although not shown, the biped robot A according to the present embodiment has, in addition to the above structural details, sensors for detecting operating positions of the joints of the legs 2 and the arms 3 (angular displacements of the electric motors for actuating the joints), sensors for detecting loads and moments acting on the feet 9 of the legs 2, and sensors for detecting an angle of inclination and an angular velocity of inclination of the upper body 1. The ECU 19 controls the electric motors for actuating the joints of the legs 2 and the arms 3 based on information obtained from the sensors (including the ground sensor 12), a predetermined program, and command information given from the remote controller 22 through the communication device 20, thereby to control operation of the robot A. Th ECU 19 also transmits the data of a detected signal from the ground sensor 12 through the communication device 20 to the remote controller 22.

In the description which follows, the leg 2 which is on the right side as viewed in the forward direction of the robot A is occasionally referred to as a right leg 2R, and the leg 2 which is on the left side as a left leg 2L (see FIG. 1) in order to distinguish the left and right legs 2, 2 from each other.

FIG. 3 shows major components of the remote controller 22 for remotely controlling the biped robot A to make a walking action on the legs 2, 2. As shown in FIG. 3, the remote controller 22 has a manipulation unit 23 which is held and manipulated by the operator and a communication device 25 connected to the manipulation unit 23 by a cable 24. The communication device 25 cooperates with the communication device 20 of the robot A in exchanging information between the manipulation unit 23 and the ECU 19 of the robot A. The communication device 25 communicates with the communication device 20 of the robot A through an antenna 25a.

The manipulation unit 23 has on its face a pair of (two) joystick-shaped manipulator levers 26, 26 for commanding motions of the legs 2, 2 of the robot A, a leg stopping switch 27 for stopping the legs 2, 2 of the robot A, and a pair of indicating lamps 28, 28 as an indicating means for indicating when each leg 2 is placed. The manipulation unit 23 also has on its side face a manipulation mode selector switch 29 (manipulation mode designating means) for selectively indicating either one of two predetermined manipulation modes.

The manipulator levers 26, 26 are disposed in respective positions on left and right sides as viewed in the forward direction of the manipulation unit 23, and supported on respective balls 30 that are rotatably disposed in the manipulation unit 23. Each of the manipulator levers 26 is angularly movable in the fore-and-aft direction as indicated by the arrow P in FIG. 3 and also in the lateral or left-and-right direction as indicated by the arrow Q in FIG. 3, and is also rotatable about a vertical axis as indicated by the arrow R in FIG. 3, upon rotation of the ball 30. Each manipulator lever 26 is erected vertically on the face of the manipulation unit 23, and is normally urged by springs (not shown) into a neutral manipulated position where a mark 26a applied to a peripheral edge of the upper end of the manipulator lever 26 faces forward of the manipulation unit 23. The neutral manipulated position is a motion stop control position according to the present invention.

As with the manipulator levers 26, 26, the indicator lamps 28, 28 are disposed in respective positions on left and right sides on the face of the control unit 23g. When the right indicator lamp 28 is turned on, it indicates to the operator of the manipulation unit 23 that the right leg 2R of the robot A is placed from its lifted state. Similarly, when the left indicator lamp 28 is turned on, it indicates to the operator of the manipulation unit 23 that the left leg 2L of the robot A is placed from its lifted state.

The manipulation modes designated by the manipulation mode selector switch 29 determine types (to be described in detail later on) of action patterns of the legs 2, 2 at the time the robot A walks under the control of the manipulator levers 26, 26. The manipulation modes include two manipulation modes, i.e., a basic manipulation mode for moving the legs 2, 2 of the robot A based on angular movement of the manipulator levers 26, 26 in the fore-and-aft direction and the lateral direction and rotation of the manipulator levers 26, 26 about the vertical axis as indicated, and a simple manipulation mode for moving the legs 2, 2 based on only angular movement of the manipulator levers 26, 26 in the fore-and-aft direction and the lateral direction.

In the description which follows, the manipulator lever 26 which is on the right side as viewed in the forward direction of the manipulation unit 23 is occasionally referred to as a right manipulator lever 26R, and the manipulator lever 26 which is on the left side as a left manipulator lever 26L in order to distinguish the left and right manipulator levers 26, 26 from each other. Likewise, the indicator lamp 28 which is on the right side is occasionally referred to as a right indicator lamp 28R, and the indicator lamp 28 which is on the left side as a left indicator lamp 28L in order to distinguish the indicator lamps 28, 28 from each other.

Figure 4:
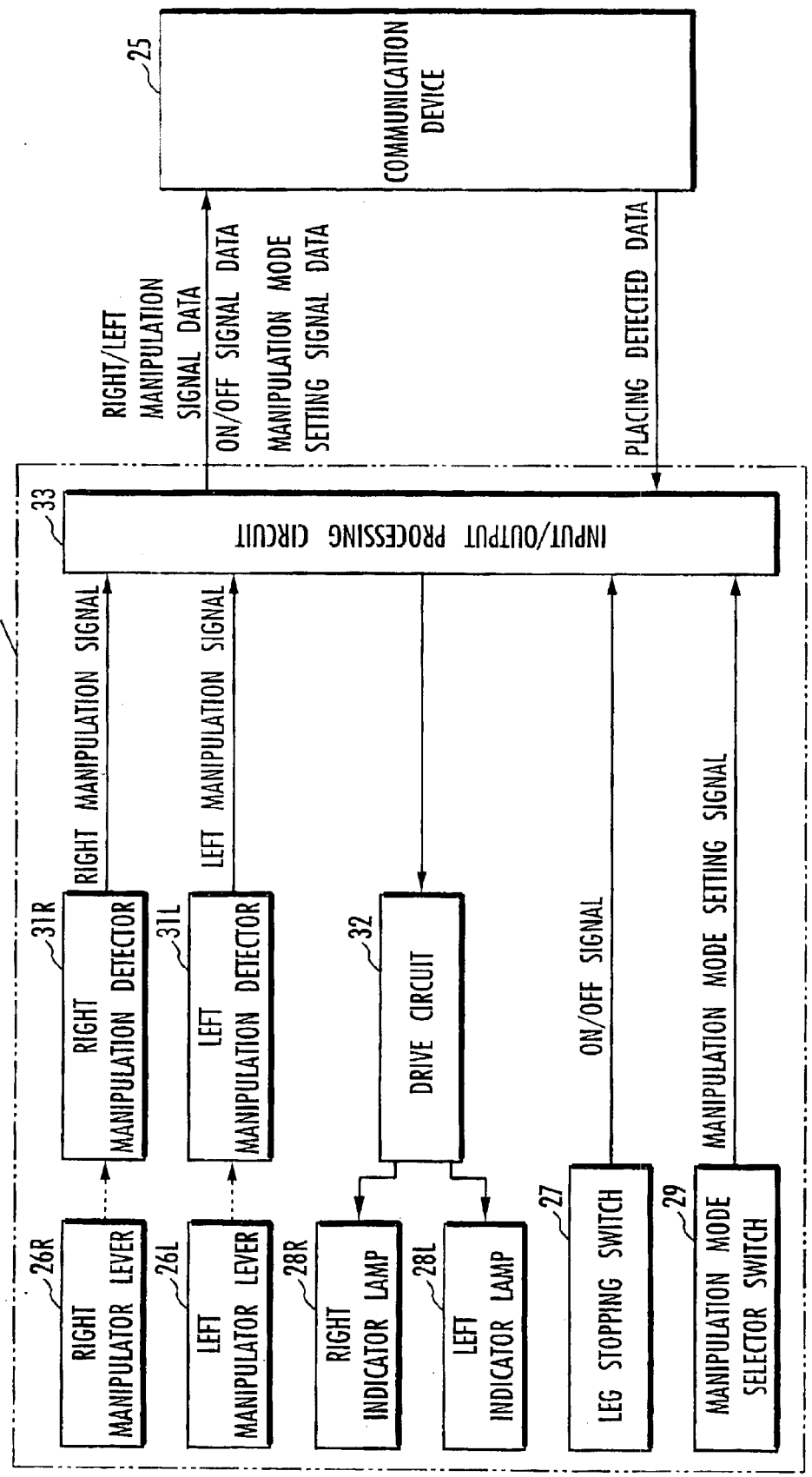
FIG. 4 is a block diagram of a control unit of the remote controller shown in FIG. 3.

As shown in a block diagram shown in FIG. 4, the manipulation unit 23 houses therein a right manipulation detector 31R for outputting a right manipulation signal representative of a manipulated position of the right manipulator lever 26R, a left manipulation detector 31L for outputting a left manipulation signal representative of a manipulated position of the left manipulator lever 26L, a drive circuit 32 for energizing the indicator lamps 28R, 28L, and an input/output processing circuit 33 connected to the communication device 25. To the input/output processing circuit 33, there are inputted manipulation signals from the manipulation detectors 31R, 31L, an ON/OFF signal from the leg stopping switch 27, and a manipulation mode setting signal from the manipulation mode selector switch 29. To the input/output processing circuit 33, there are also inputted detected data of the placing of the legs 2 (hereinafter referred to as "placing detected data") from the ground sensors 12 on the legs 2 of the robot A through the communication device 25.

Each of the manipulation detectors 31R, 31L comprises an encoder, a potentiometer, or the like, not shown in specific detail. Each of the manipulation detectors 31R, 31L output three manipulation signals including a fore-and-aft manipulation signal representative of a manipulated position in the fore-and-aft direction of the manipulator lever 26, a lateral manipulation signal representative of a manipulated position in the lateral direction of the manipulator lever 26, and an angular manipulation signal representative of a manipulated position about the vertical axis. Specifically, each of the manipulation detectors 31R, 31L outputs a signal depending on an angular movement in the fore-and-aft direction of the manipulator lever 26 from the neutral manipulated position (a rotational angle about a lateral axis of the ball 30) and the direction of the angular movement (a rotational direction about the lateral axis of the ball 30), as the fore-and-aft manipulation signal, and also outputs a signal depending on an angular movement in the lateral direction of the manipulator lever 26 from the neutral manipulated position (a rotational angle about a fore-and-aft axis of the ball 30) and the direction of the angular movement (a rotational direction about the fore-and-aft axis of the ball 30), as the lateral manipulation signal. Each of the manipulation detectors 31R, 31L also outputs a signal depending on an angular movement about the vertical axis from the neutral manipulated position (a rotational angle about the vertical axis of the ball 30) and the direction of the angular movement, as the angular manipulation signal.

The input/output processing circuit 33 successively outputs manipulation signals from the manipulation detectors 31R, 31L, an ON/OFF signal from the leg stopping switch 27, and the data of a manipulation mode setting signal from the manipulation mode selector switch 29, to the communication device 25, which then transmit the supplied signals and data to the robot A. The input/output processing circuit 33 also controls the drive circuit 32 for energizing the indicator lamps 28R, 28L depending on the placing detected data given from the robot A through the communication device 25.

Operation of the remote controller according to the present embodiment will be described below.

A basic process of controlling motions of the legs 2, 2 with the ECU 19 of the robot A will first be described below.

In the present embodiment, the ECU 19 of the robot A basically controls the electric motors for actuating the joints of the legs 2, 2 to alternately place and lift the legs 2, 2 at a timing in synchronism with a clock having a predetermined period, for thereby causing the robot A to walk (move).

According to the control process of the ECU 19, a desired gait as a motion command which determines a motion pattern of the legs 2 (leg motion pattern) at the time the robot A moves is generated based on the data of the right manipulation signal and the left manipulation signal (the data representative of the manipulated positions of the manipulator levers 26 of the manipulation unit 23) which are given from the input/output processing circuit 33 of the manipulation unit 23 through the communication devices 25, 20. The desired gait comprises parameters determining the attitude of the upper body 1 and the positions and attitudes of the feet 9 of the legs 2. The ECU 19 controls the electric motors for actuating the joints of the legs 2, 2 based on the generated desired gait, thereby moving the legs 2, 2.

In the present embodiment, the ECU 19 generates a desired gait for two steps of the walking action of the robot A each time the robot A walks one step, i.e., each time the free leg 2 is placed. Specifically, a desired gait for one step is a desired gait which determines a motion of the legs 2 from the start of a two-leg support period where both the legs 2, 2 are placed until the end of a one-leg support period where one of the legs 2 is lifted (in the free leg), i.e., until a next two-leg support period begins. Therefore, a desired gait for two steps is made up of a desired gait (hereinafter referred to as "current time gait") from the start of a two-leg support period in the walking action of the robot A until the start of a next two-leg support period, and a desired gait (hereinafter referred to as "next time gait") from the start of the next two-leg support period until the start of another next two-leg support period.

The basic control process of the ECU 19 with respect to the generation of a desired gait (a current time gait and a next time gait) and the control of the motion of the legs 2 according to the desired gait will be described below with reference to FIGS. 5 and 6.

Figure 5:
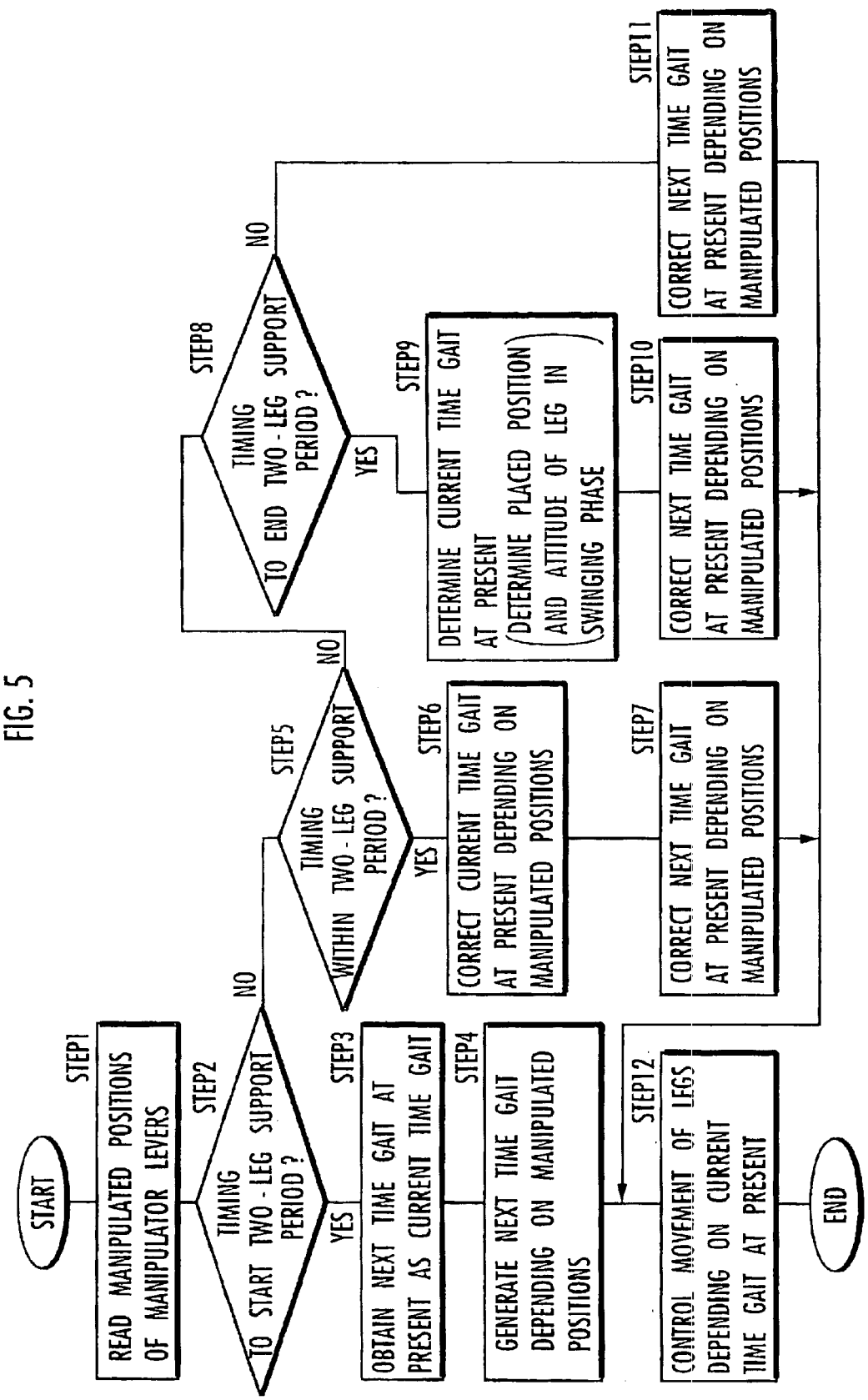
FIG. 5 is a flowchart of a control sequence for controlling the robot.

The ECU 19 executes a processing sequence shown in a flowchart illustrated in FIG. 5 in predetermined control cycles (each in 10 ms, for example) to generate a desired gait (a current time gait and a next time gait) and control the motion of the legs 2 of the robot A. Specifically, the ECU 19 reads present manipulated positions of the manipulator levers 26 of the manipulation unit 23 from the data of the control signals that are given from the manipulation unit 23 through the communication devices 25, 20 in each control cycle (STEP 1). Then, the ECU 19 determines whether the present timing is a timing to start a two-leg support period or not (STEP 2). If the present timing is a timing to start a two-leg support period, then the ECU 19 obtains a next time gait that is presently generated (which is generated within a period from the start of a preceding two-leg support period to the start of a present two-leg support period) as a current time gait (STEP 3). The ECU 19 then generates a next time gait depending on the present manipulated positions of the manipulator levers 26 which have been read in STEP 1 (STEP 4). Specific gait patterns depending on the manipulated positions of the manipulator levers 26 will be described later on.

If the present timing is not a timing to start a two-leg support period in STEP 2, then the ECU 19 determines whether the present timing is a timing within a two-leg support period (a timing within a period immediately after the start of a two-leg support period and immediately before the end of the two-leg support period) or not (STEP 5). If the present timing is a timing within a two-leg support period, then the ECU 19 corrects a current time gait and a next time gait at the present time (more specifically, the placed positions and attitudes of the free leg 2 in the current time gait and the next time gait) depending on the present manipulated positions of the manipulator levers 26 (STEPS 6, 7). In this case, the placed positions and attitudes of the free leg 2 in the current time gait and the next time gait are corrected, in principle, so as to correspond to the manipulated positions of the manipulator levers 26. However, if the manipulated positions of the manipulator levers 26 are changed to manipulated positions for quickly changing the present direction in which the robot A moves, then the placed positions and attitudes of the free leg 2 in the current time gait and the next time gait are corrected so as to keep the robot A stable in attitude. Since the current time gait in particular serves to determine a motion of the free leg 2 immediately after the present timing, the placed position and attitude of the free leg 2 in the current time gait are corrected so as to minimize a corrective quantity from the current time gait obtained in STEP 3.

If the present timing is not a timing within a two-leg support period in STEP 5, then the ECU 19 determines whether the present timing is a timing to end a two-leg support period (a timing to start a one-leg support period) or not (STEP 8). If the present timing is a timing to end a two-leg support period, then the ECU 19 determines the current time gait at the present time as a final current time gait (STEP 9). The ECU 19 then corrects the next time gait at the present time depending on the manipulated positions of the manipulator levers 26 as in STEP 7 (STEP 10).

If the present timing is not a timing to end a two-leg support period in STEP 8, i.e., if one of the legs 2 is in a one-leg support period where it is lifted, then the ECU 19 corrects the next time gait at the present time depending on the manipulated positions of the manipulator levers 26 as in STEP 7 (STEP 11).

After having generated or corrected the current time gait and the next time gait as described (after having executed STEPS 4, 7, 10, 11), the ECU 19 controls the movement of the legs 3, 3 depending on the current time gait at the present time (STEP 12).

Figure 6:
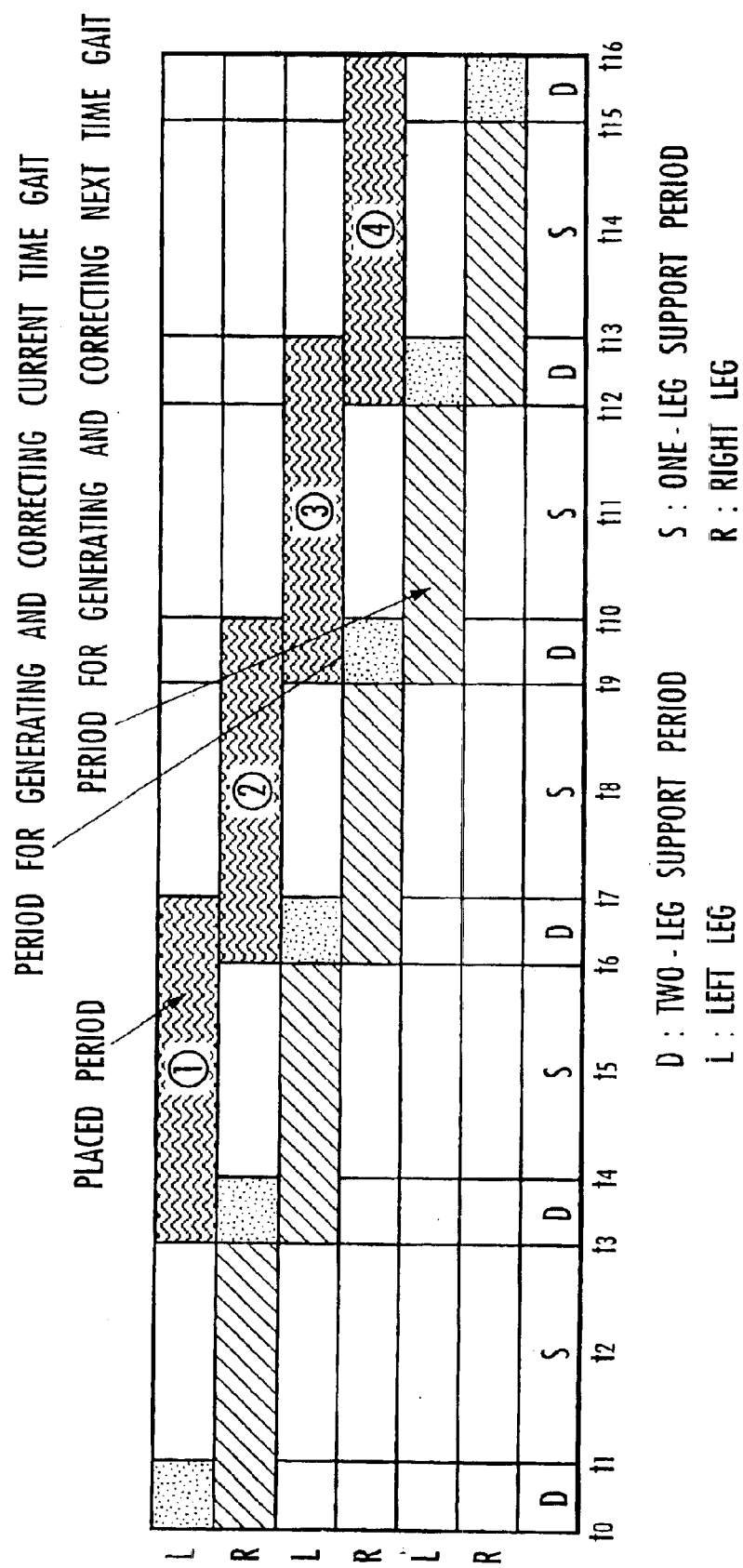
FIG. 6 is a diagram illustrative of the control sequence for controlling the robot.

FIG. 6 is a chronological representation of the control process which is carried out by the ECU 19 as described above while the robot A is walking. In FIG. 6, t0, t1, represent times, "D", "S" represent a two-leg support period and a one-leg support period, respectively, and "L", "R" represent the left leg 2L and the right leg 2R, respectively. Squiggled cells represent periods in which the leg 2L or the leg 2R is placed. "L" or "R" associated with the same rows as those squiggled cells indicates that either one of the legs 2L, 2R is placed. For example, the squiggled cell in the period between times t3 and t7 represents that the left leg 2L is placed in that period.

Stippled cells represent periods in which the current time gait is generated and corrected. "L" or "R" associated with the same rows as those stippled cells indicates the free leg 2L or 2R at the current time gait corresponding to the stippled cell in question. For example, the stippled cell in the period between times t3–t4 represents that the current time gait with the right free leg 2R is generated and appropriately corrected in that period. Hatched cells represent periods in which the next time gait is generated and corrected. "L" or "R" associated with the same rows as those hatched cells indicates the free leg 2L or 2R at the next time gait corresponding to the hatched cell in question. For example, the hatched cell in the period between times t3–t6 represents that the next time gait with the left free leg 2L is generated and appropriately corrected in that period.

At a time t6 (when the two-leg support period t6–t7 is started and the right leg 2R starts to be placed), for example, the ECU 19 obtains the next time gait (the desired gait with the left free leg 2L) generated and corrected in the period t3–t6 immediately prior to the time t6 as the current time gait which determines a leg motion pattern for the left leg 2L immediately after the time t6. The current time gait is appropriately corrected depending on the manipulated positions of the manipulator levers 26 until at time t7 when the left leg 2L starts to be lifted, and is determined at the time t7. The left free leg 2L in the period t7–t9 is moved (for the placed position and attitude of the left leg 2L at the time t9) based on the current time gait determined at the time t7. At the time t6 a next time gait with the right free leg 2R (a next time gait following the current time gait t6–t9) is generated depending on the manipulated positions of the manipulator levers 26. The generated next time gait is appropriately corrected depending on the manipulated positions of the manipulator levers 26 until the actual motion of the legs 3 based on the current time gait is ended (at the time t9 when the left leg 2L is placed from the lifted state). At the time t9, this next time gait then becomes a current time gait for a period t9–t12.

According to the present embodiment, as described above, each time the robot A walks one step, a current time gait and a next time gait which serve as a desired gait for two steps are appropriately generated and corrected depending on the manipulated positions of the manipulator levers 26 of the manipulation unit 23, and the legs 3, 3 are controlled in motion based on the desired gait.

Specific gait patterns of the legs 3, 3 controlled by the ECU 19 depending on the manipulated positions of the manipulator levers 26 of the manipulation unit 23 will be described below.

First, specific gait patterns in the case where the manipulation mode of the manipulation unit 23 is set to the basic manipulation mode by the manipulation mode selector switch 29 and the data representing the basic manipulation mode is given from the input/output processing circuit 33 of the manipulation unit 23 through the communication devices 25, 20 to the ECU 19 of the robot A will be described below.

With the manipulation mode of the manipulation unit 23 being set to the basic manipulation mode, the ECU 19 of the robot A determines each of the manipulated position in the fore-and-aft direction, the manipulated position in the lateral direction, and the manipulated position about the vertical axes of each of the manipulator levers 26 of the manipulation unit 23, as being classified into one of three types, based on the data of the manipulation signals that are given from the manipulation unit 23 through the communication devices 25, 20.

Specifically, with respect to angular manipulation of each of the manipulator levers 26 in the fore-and-aft direction, the ECU 19 judges that the manipulator lever 26 is in the neutral manipulated position if an angular displacement of the manipulator lever 26 from the neutral manipulated position in the fore-and-aft direction is less than a predetermined displacement, and that a manipulated position of the manipulator lever 26 is a forward manipulated position and a rearward manipulated position if an angular displacement of the manipulator lever 26 from the neutral manipulated position is equal to or greater than the predetermined displacement in the forward direction and equal to or greater than the predetermined displacement in the rearward direction, respectively.

The same judging process applies also with respect to angular manipulation of each of the manipulator levers 26 in the lateral direction and about the vertical axis. The ECU 19 determines whether a manipulated position of each of the manipulator levers 26 in the lateral direction is the neutral manipulated position, a rightward manipulated position, or a leftward manipulated position depending on whether or not an angular displacement of the manipulator lever 26 from the neutral manipulated position in the lateral direction is equal to or greater than a predetermined displacement.

The ECU 19 also determines whether a manipulated position of each of the manipulator levers 26 about the vertical axis (hereinafter simply referred to as "rotationally manipulated position") is the neutral manipulated position, a clockwise turned position (hereinafter referred to as "rightward rotationally manipulated position"), or a counterclockwise turned position (hereinafter referred to as "leftward rotationally manipulated position") depending on whether or not an angular displacement of the manipulator lever 26 about the vertical axis (an angular displacement from the neutral manipulated position) is equal to or greater than a predetermined displacement clockwise or counterclockwise.

Then, the ECU 19 moves the legs 2, 2 according to gait patterns shown in FIGS. 7, 8(a) through 8(d), 9(a) through 9(d), and 10(a) through 10(d) depending on the manipulated positions of the manipulator levers 26R, 26L of the manipulation unit 23.

Figure 7:
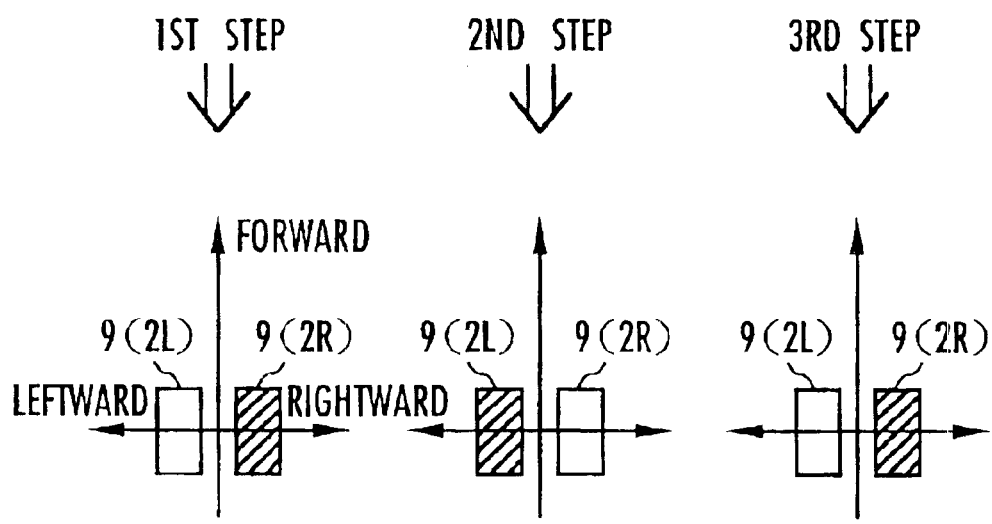
Figure 8:
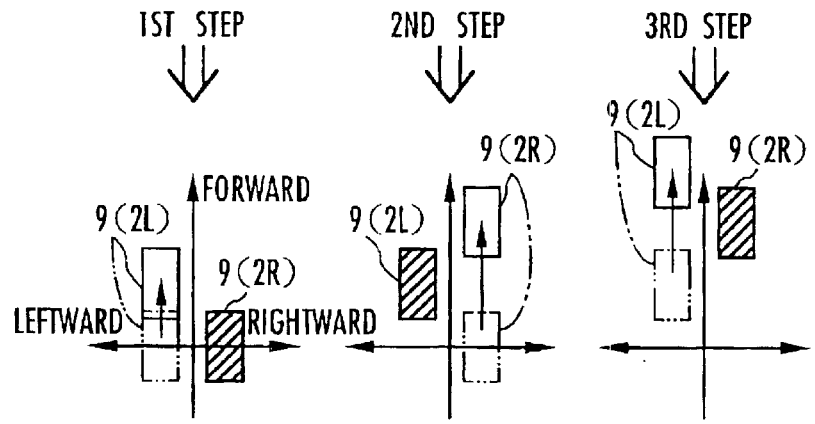
Figure 8:
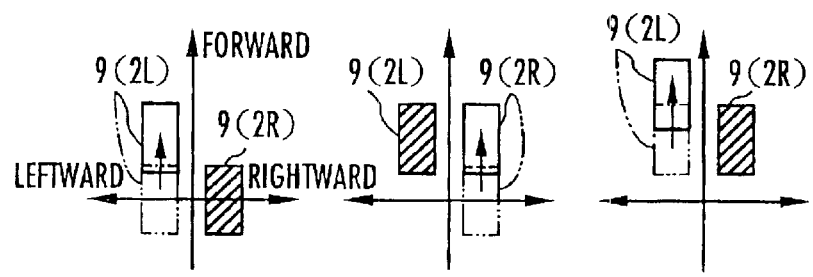
Figure 8:
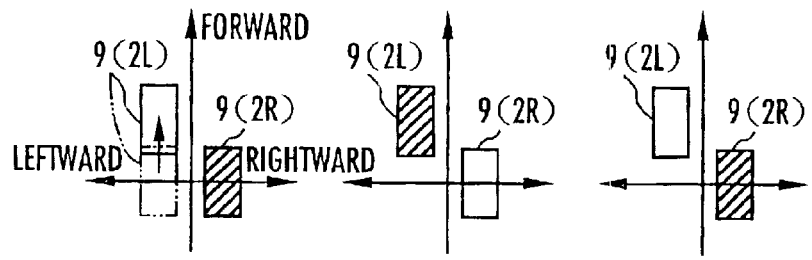
Figure 8:
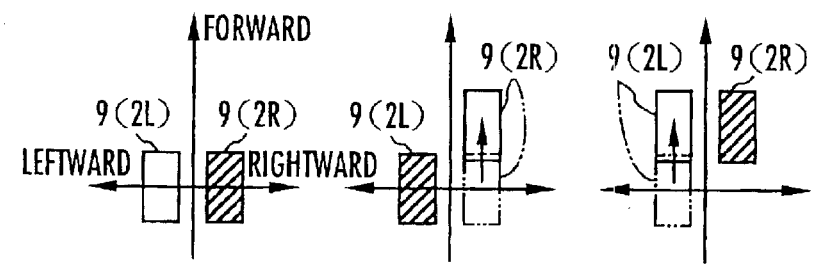
Figure 10:
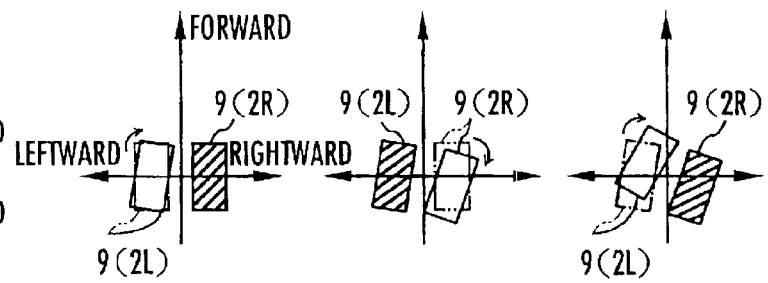
Figure 10:
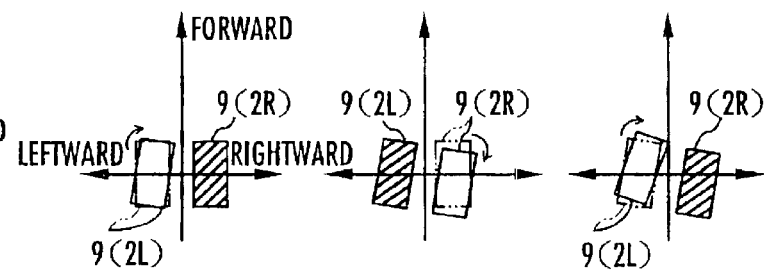
Figure 10:
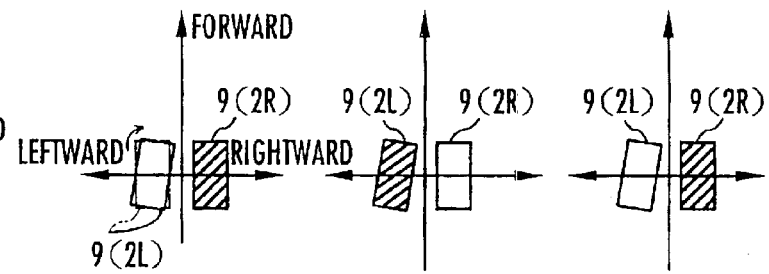
Figure 10:
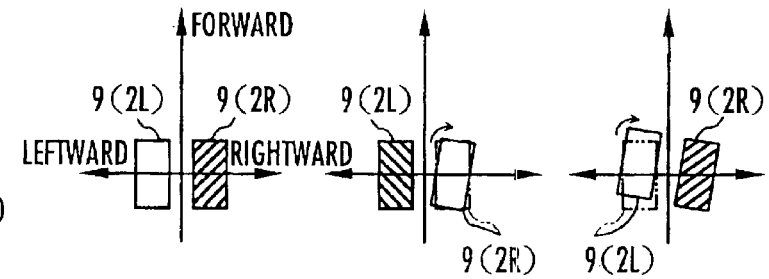
Figure 11:
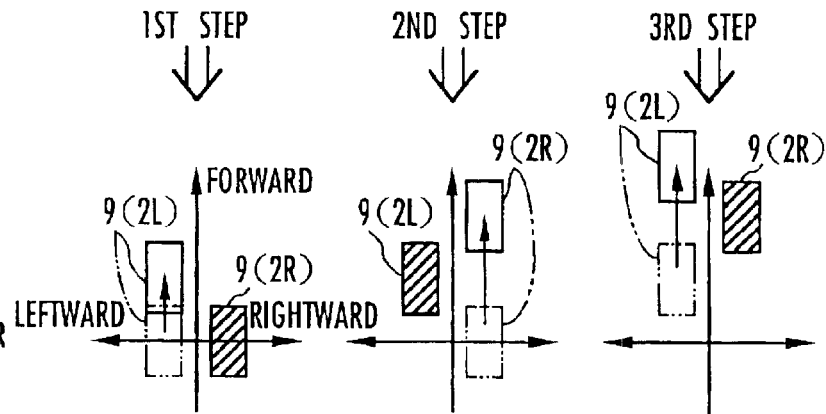
Figure 11:
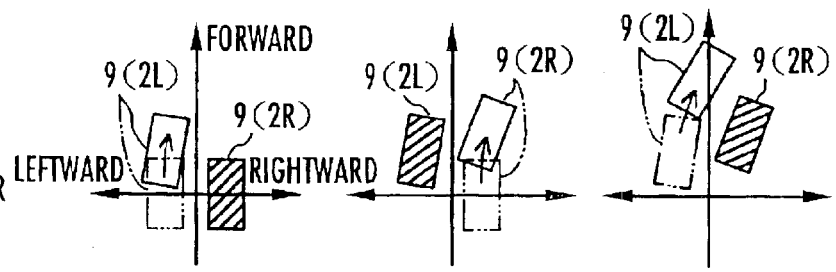
Figure 11:
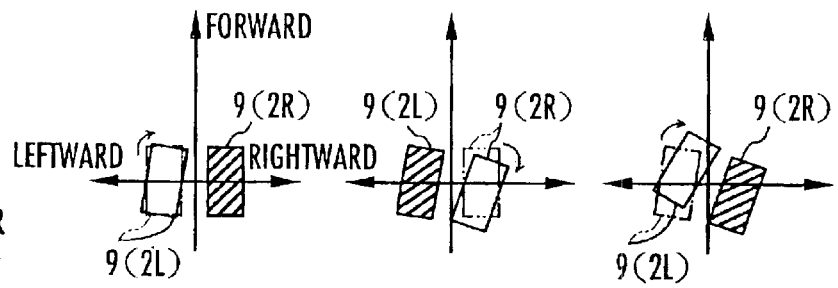
Figure 11:
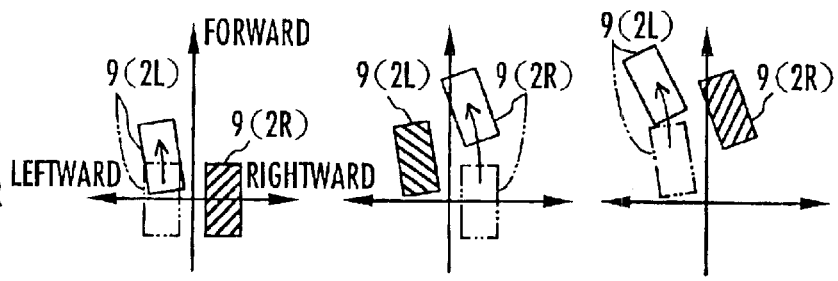

These figures schematically show motions of the feet 9 (as viewed in plan from above the robot A) chronologically successively from the left of the figures for first through third steps of the legs 2, 2 when the manipulator levers 26R, 26L are manipulated into the illustrated manipulated positions while the legs 2, 2 have been parallel to each other in the lateral direction and stepping in the same position or have been continuously placed (a state in which the robot A is not moving as described later on with reference to FIG. 7). In each of the figures, a blank foot 9 represents the foot 9 of the free leg 2, and a hatched foot 9 represents the foot 9 of the supporting leg 2. In each of the figures, "NEUTRAL", "FORWARD", "REARWARD", "RIGHTWARD", "LEFTWARD", "TURNED RIGHTWARD", and "TURNED LEFTWARD" refer respectively to the neutral manipulated position, the forward manipulated position, the rearward manipulated position, the rightward manipulated position, the leftward manipulated position, the rightward rotationally manipulated position, and the leftward rotationally manipulated position, which have been described above.

In the examples shown in FIGS. 7–10(a) through 10(d), more specifically, prior to the timing to lift the left leg 2L (e.g., within the period from the times t3–t6 shown in FIG. 6), the manipulator levers 26R, 26L are shifted from the neutral manipulated position to the illustrated manipulated positions and are then steadily held in the manipulated positions, and the desired gait (the current time gait and the next time gait) is generated depending on the manipulated positions.

The next time gait generated by the ECU 19 prior to the start of a two-leg support period immediately before the left leg 2L is lifted (e.g., the next time gait in the period t3–t6 shown in FIG. 6) is corrected (updated) into a gait corresponding to the manipulated positions indicated in each of FIGS. 7–10(a) through 10(d) at the time the manipulator levers 26R, 26L are shifted to that manipulated position, and is then determined as the current time gait (the desired gait for the first step in each of FIGS. 7–10(a) through 10(d), the gait for moving the left free leg 2L) in the two-leg support period (e.g., t6–t7 in FIG. 6) immediately before the left leg 2L is lifted. A next time gait newly generated from the start of a two-leg support period immediately before the left leg 2L is lifted for the first step (e.g., a next time gait in the period t6–t9 in FIG. 6) is generated and maintained so as to correspond to the manipulated positions of the manipulator levers 26R, 26L indicated in each of FIGS. 7–10(a) through 10(d), and becomes the current time gait (the desired gait for the second step in each of FIGS. 7–10(a) through 10(d), the gait for moving the right free leg 2R) when the left leg 2L is placed after it has been lifted (e.g., at the time t9 in FIG. 6). Furthermore, a next time gait newly generated from the start of a two-leg support period immediately before the right leg 2R is lifted for the second step (e.g., a next time gait in the period t9–t12 in FIG. 6) is generated and maintained so as to correspond to the manipulated positions of the manipulator levers 26R, 26L indicated in each of FIGS. 7–10(a) through 10(d), and becomes the current time gait (the desired gait for the third step in each of FIGS. 7–10(a) through 10(d), the gait for moving the left free leg 2L) when the right leg 2R is placed after it has been lifted (e.g., at the time t12 in FIG. 6). The generation of such a current time gait and a next time gait will subsequently be repeated steadily.

The gait patterns shown in FIGS. 7–10(a) through 10(d) will be described in detail below. When both the manipulator levers 26R, 26L of the manipulation unit 23 are steadily shifted to the neutral manipulated positions as shown in FIG. 7 (it is assumed that the leg stopping switch 27 of the manipulation unit 23 is turned off), the ECU 19 generates a desired gait for keeping the feet 9, 9 of the legs 2L, 2R parallel to each other at a spaced interval in the lateral direction and repeatedly lifting and placing them alternately in the same position, thus causing the legs 2L, 2R to make a stepping action. In this state, the robot A does not move.

While both the manipulator levers 26R, 26L of the manipulation unit 23 are being shifted to the neutral manipulated positions, when the leg stopping switch 27 of the manipulation unit 23 is turned on and the data representing the turning-on of the leg stopping switch 27 is given from the input/output processing circuit 33 of the manipulation unit 23 through the communication devices 25, 20 to the ECU 19 of the robot A, the ECU 19 generates a desired gait for keeping the feet 9, 9 of both the legs 2L, 2R in a placed state parallel to each other in the lateral direction (hereinafter referred to as "parallel placed state"). The spaced interval between the feet 9, 9 in the lateral direction at this time is the same as the spaced interval between the feet 9, 9 at the time when the feet 9, 9 of both the legs 2L, 2R are in the placed state in the stepping action. The stepping action of both the legs 2L, 2R is thus stopped from the time when both feet 9, 9 of the legs 2L, 2R are placed.

While both the legs 2L, 2R are being kept in the placed state, when the leg stopping switch 27 is turned off, the legs 2L, 2R start a stepping action again. As described above, while the legs 2L, 2R are in the stepping action, a current time gait and a next time gait, as described above, are generated as a desired gait for two steps each time one step of a walking action is made. For example, in a first step shown in FIG. 7, in a two-leg support period immediately before the left leg 2L is operated as the free leg, a current time gait as a desired gait for the first step is generated and determined. Then, a current time gait as a desired gait for a second step is generated in a period from the start of the two-leg support period until the left leg 2L is placed after it has been lifted.

In the description which follows, the spaced interval between both the feet 9, 9 in the lateral direction in the above stepping action or in the parallel placed state will be referred to as a basic foot spacing.

FIGS. 8(a) through 8(d) show basic patterns of walking actions of the robot A based on angular displacements of the manipulator levers 26R, 26L in the fore-and-aft direction. In this case, the placed position and attitude of the foot 9 of the left leg 2L with respect to the foot 9 of the right leg 2R in the fore-and-aft direction for operating the left free leg 2L are determined depending on the manipulated position of the left manipulator lever 26L in the fore-and-aft direction (the forward manipulated position, the rearward manipulated position, or the neutral manipulated position). Similarly, the placed position and attitude of the foot 9 of the right leg 2R with respect to the foot 9 of the left leg 2L in the fore-and-aft direction for operating the right free leg 2R are determined depending on the manipulated position of the right manipulator lever 26R in the fore-and-aft direction.

For example, when the left manipulator lever 26L and the right manipulator lever 26R are steadily shifted to the forward manipulated position, as shown in FIG. 8(a), the ECU 19 generates a current time gait and a next time gait in each step for placing the foot 9 of the left leg 2L in a position stepped forward a predetermined distance from the foot 9 of the right leg 2R (this action corresponds to the left manipulator lever 26L shifted to the forward manipulated position) when the left leg 2L and the right leg 2R are operated as the free leg and the supporting leg, respectively (see a first step and a third step in FIG. 8(a)), and for placing the foot 9 of the right leg 2R in a position stepped forward a predetermined distance from the foot 9 of the left leg 2L (this action corresponds to the right manipulator lever 26R shifted to the forward manipulated position) when the left leg 2L and the right leg 2R are operated as the supporting leg and the free leg, respectively (see a second step in FIG. 8(a)). The robot A now walks forward according to the motion pattern of both the legs 2L, 2R shown in FIG. 8(a).

When the left manipulator lever 26L and the right manipulator lever 26R are shifted to the forward manipulated position and the neutral manipulated position, respectively, as shown in FIG. 8(b), the ECU 19 generates a desired gait (a current time gait and a next time gait) for two steps in each step for placing the foot 9 of the left leg 2L in a position stepped forward a predetermined distance from the foot 9 of the right leg 2R (this action is the same as the action in FIG. 8(a)) when the left leg 2L and the right leg 2R are operated as the free leg and the supporting leg, respectively (see a first step and a third step in FIG. 8(b)), and for placing the foot 9 of the right leg 2R in a position parallel to the foot 9 of the left leg 2L at the basic foot spacing in the lateral direction (this action corresponds to the right manipulator lever 26R shifted to the neutral manipulated position) when the left leg 2L and the right leg 2R are operated as the supporting leg and the free leg, respectively (see a second step in FIG. 8(b)). The robot A now walks forward according to the pattern shown in FIG. 8(b).

The walking action shown in FIG. 8(b) takes place similarly as shown in FIG. 8(d) even when the left manipulator lever 26L and the right manipulator lever 26R are shifted to the neutral manipulated position and the forward manipulated position, respectively. In this case, however, since the left manipulator lever 26L is shifted to the neutral manipulated position, when the left leg 2L is the free leg (a first step and a third step in FIG. 8(d)), the foot 9 of the left leg 2L is moved to a position parallel to the foot 9 of the right leg 2R at the basic foot spacing in the lateral direction. In FIG. 8(d), as the left leg 2L is the free leg in the first step, the robot A does not move forward in the first step.

When the left manipulator lever 26L and the right manipulator lever 26R are shifted to the forward manipulated position and the rearward manipulated position, respectively, as shown in FIG. 8(c), the ECU 19 generates a desired gait (a current time gait and a next time gait) for two steps in each step for placing the foot 9 of the left leg 2L in a position stepped forward a predetermined distance from the foot 9 of the right leg 2R (this action is the same as the action in FIG. 8(a)) when the left leg 2L and the right leg 2R are operated as the free leg and the supporting leg, respectively (see a first step and a third step in FIG. 8(c)), and for placing the foot 9 of the right leg 2R in a position stepped rearward a predetermined distance from the foot 9 of the left leg 2L when the left leg 2L and the right leg 2R are operated in the supporting leg and in the free phase, respectively (see a second step in FIG. 8(c)). In this case, therefore, after the foot of the left free leg 2L is stepped forward in the first step, the legs 2L, 2R repeat their stepping action while the feet 9, 9 are being kept in their positional and attitudinal relationship in the fore-and-aft direction in the first step.

In this manner, with respect to the angular manipulation of the manipulator levers 26L, 26R in the fore-and-aft direction, depending on whether the left manipulator lever 26L is shifted to the forward, neutral, or rearward manipulated position, the placed position and attitude in the fore-and-aft direction of the foot 9 of the left leg 2L with respect to the foot 9 of the right leg 2R are determined irrespective of the manipulated position of the right manipulator lever 26R in the fore-and-aft direction when the left leg 2L is operated as the free leg. Depending on whether the right manipulator lever 26R is shifted to the forward, neutral, or rearward manipulated position, the placed position and attitude in the fore-and-aft direction of the foot 9 of the right leg 2R with respect to the foot 9 of the left leg 2L are determined irrespective of the manipulated position of the left manipulator lever 26L in the fore-and-aft direction when the right leg 2R is operated as the free leg.

According to any one of the patterns shown in FIGS. 8(a) through 8(d), when both the manipulator levers 26L, 26R are continuously shifted to the same manipulated positions, the actions in the second step and the third step are alternately repeated for fourth and subsequent steps.

FIGS. 9(a) through 9(d) show patterns of walking actions of the robot A based on angular displacements of the manipulator levers 26R, 26L in the lateral direction. In this case, the placed position and attitude of the foot 9 of the left leg 2L with respect to the foot 9 of the right leg 2R in the lateral direction for operating the left leg 2L as the free leg are determined depending on the manipulated position of the left manipulator lever 26L in the lateral direction (the leftward manipulated position, the rightward manipulated position, or the neutral manipulated position). Similarly, the placed position and attitude of the foot 9 of the right leg 2R with respect to the foot 9 of the left leg 2L in the lateral direction for operating the right leg 2R as the free leg are determined depending on the manipulated position of the right manipulator lever 26R in the lateral direction.

For example, when the left manipulator lever 26L and the right manipulator lever 26R are shifted to the rightward manipulated position, as shown in FIG. 9(a), the ECU 19 generates a desired gait (a current time gait and a next time gait) for two steps in each step for placing the foot 9 of the left leg 2L in a position closer rightward a predetermined distance to the foot 9 of the right leg 2R than the basic foot spacing (this action corresponds to the left manipulator lever 26L shifted to the rightward manipulated position) when the left leg 2L and the right leg 2R are operated as the free leg and the supporting leg, respectively (see a first step and a third step in FIG. 9(a)), and for placing the foot 9 of the right leg 2R in a position farther rightward a predetermined distance from the foot 9 of the left leg 2L than the basic foot spacing (this action corresponds to the right manipulator lever 26R shifted to the rightward manipulated position) when the left leg 2L and the right leg 2R are operated as the supporting leg and the free leg, respectively (see a second step in FIG. 9(a)). The robot A now walks laterally rightward according to the motion pattern of both the legs 2L, 2R shown in FIG. 9(a).

When the left manipulator lever 26L and the right manipulator lever 26R are shifted to the rightward manipulated position and the neutral manipulated position, respectively, as shown in FIG. 9(b), the ECU 19 generates a desired gait (a current time gait and a next time gait) for two steps in each step for placing the foot 9 of the left leg 2L in a position closer rightward a predetermined distance to the foot 9 of the right leg 2R than the basic foot spacing (this action is the same as the action in FIG. 9(a)) when the left leg 2L and the right leg 2R are operated as the free leg and the supporting leg, respectively (see a first step and a third step in FIG. 9(b)), and for placing the foot 9 of the right leg 2R in a position parallel to the foot 9 of the left leg 2L at the basic foot spacing in the lateral direction (this action corresponds to the right manipulator lever 26R shifted to the neutral manipulated position) when the left leg 2L and the right leg 2R are operated as the supporting leg and the free leg, respectively (see a second step in FIG. 9(b)). The robot A now walks laterally rightward according to the pattern shown in FIG. 9(b).

The walking action shown in FIG. 9(b) takes place similarly as shown in FIG. 9(d) even when the left manipulator lever 26L and the right manipulator lever 26R are shifted to the neutral manipulated position and the rightward manipulated position, respectively. In this case, however, since the left manipulator lever 26L is shifted to the neutral manipulated position, when the left leg 2L is the free leg (a first step and a third step in FIG. 9(d)), the foot 9 of the left leg 2L is moved to a position parallel to the foot 9 of the right leg 2R at the basic foot spacing in the lateral direction. In FIG. 9(d), as the left leg 2L is the free leg in the first step, the robot A does not move rightward in the first step. Furthermore, because the right manipulator lever 26L is shifted to the rightward manipulated position, when the right leg 2R is the free leg (a second step in FIG. 9(d)), the foot 9 of the right leg 2R is moved rightward to a position spaced farther a predetermined distance from the foot 9 of the left leg 2L than the basic foot spacing.

When the left manipulator lever 26L and the right manipulator lever 26R are shifted to the rightward manipulated position and the leftward manipulated position, respectively, as shown in FIG. 9(c), the ECU 19 generates a desired gait (a current time gait and a next time gait) for two steps in each step for placing the foot 9 of the left leg 2L in a position closer laterally a predetermined distance to the foot 9 of the right leg 2R than the basic foot spacing (this action is the same as the action in FIG. 9(a)) when the left leg 2L and the right leg 2R are operated as the free leg and the supporting leg, respectively (see a first step and a third step in FIG. 9(c)), and for placing the foot 9 of the right leg 2R in a position closer laterally a predetermined distance to the foot 9 of the left leg 2L than the basic foot spacing (this action corresponds to the right manipulator lever 26R shifted to the leftward manipulated position) when the left leg 2L and the right leg 2R are operated as the supporting leg and the free leg, respectively (see a second step in FIG. 9(c)). In this case, therefore, after the foot of the left free leg 2L is brought closer laterally to the foot 9 of the right leg 2R in the first step, the legs 2L, 2R repeat their stepping action while the feet 9, 9 are being kept in their positional and attitudinal relationship in the lateral direction in the first step.

In this manner, with respect to the angular displacements of the manipulator levers 26L, 26R in the lateral direction, depending on whether the left manipulator lever 26L is shifted to the rightward, neutral, or leftward manipulated position, the placed position and attitude in the lateral direction of the foot 9 of the left leg 2L with respect to the foot 9 of the right leg 2R are determined irrespective of the manipulated position of the right manipulator lever 26R in the lateral direction when the left leg 2L is operated as the free leg. Depending on whether the right manipulator lever 26R is shifted to the rightward, neutral, or leftward manipulated position, the placed position and attitude in the lateral direction of the foot 9 of the right leg 2R with respect to the foot 9 of the left leg 2L are determined irrespective of the manipulated position of the left manipulator lever 26L in the lateral direction when the right leg 2R is operated as the free leg.

According to any one of the patterns shown in FIGS. 9(a) through 9(d), when both the manipulator levers 26L, 26R are continuously shifted to the same manipulated positions, the actions in the second step and the third step are alternately repeated for fourth and subsequent steps.

FIGS. 10(a) through 10(d) show patterns of walking actions of the robot A based on rotations of the manipulator levers 26R, 26L. In this case, the placed position and attitude of the foot 9 of the left leg 2L with respect to the foot 9 of the right leg 2R in the rotational direction for operating the left leg 2L as the free leg are determined depending on the rotationally manipulated position of the left manipulator lever 26L (the leftward rotationally manipulated position, the rightward rotationally manipulated position, or the neutral manipulated position). Similarly, the placed position and attitude of the foot 9 of the right leg 2R with respect to the foot 9 of the left leg 2L in the rotational direction for operating the right free leg 2R are determined depending on the rotationally manipulated position of the right manipulator lever 26R.

For example, when the left manipulator lever 26L and the right manipulator lever 26R are shifted to the rightward rotationally manipulated position, as shown in FIG. 10(a), the ECU 19 generates a desired gait (a current time gait and a next time gait) for two steps in each step for placing the foot 9 of the left leg 2L in a position turned a predetermined angular distance clockwise with respect to the foot 9 of the right leg 2R (this action corresponds to the left manipulator lever 26L shifted to the rightward rotationally manipulated position) when the left leg 2L and the right leg 2R are operated as the free leg and the supporting leg, respectively (see a first step and a third step in FIG. 10(a)), and for placing the foot 9 of the right leg 2R in a position turned a predetermined angular distance clockwise with respect to the foot 9 of the left leg 2L (this action corresponds to the right manipulator lever 26R shifted to the rightward rotationally manipulated position) when the left leg 2L and the right leg 2R are operated as the supporting leg and the free leg, respectively (see a second step in FIG. 10(a)). The robot A now turns clockwise according to the motion pattern of both the legs 2L, 2R shown in FIG. 10(a). In this case, when the left leg 2L is in the sweeping phase, both the feet 9, 9 are of a pigeon-toed attitude, and when the right leg 2R is in the sweeping phase, both the feet 9, 9 are of a bandy-legged attitude.

When the left manipulator lever 26L and the right manipulator lever 26R are shifted to the rightward rotationally manipulated position and the neutral manipulated position, respectively, as shown in FIG. 10(b), the ECU 19 generates a desired gait (a current time gait and a next time gait) for two steps in each step for placing the foot 9 of the left leg 2L in a position turned a predetermined angular distance clockwise with respect to the foot 9 of the right leg 2R (this action is the same as the action shown in FIG. 10(a)) when the left leg 2L and the right leg 2R are operated as the free leg and the supporting leg, respectively (see a first step and a third step in FIG. 10(b)), and for placing the foot 9 of the right leg 2R in a position parallel to the foot 9 of the left leg 2L at the basic foot spacing (this action corresponds to the right manipulator lever 26R shifted to the neutral manipulated position) when the left leg 2L and the right leg 2R are operated as the supporting leg and the free leg, respectively (see a second step in FIG. 10(b)). The robot A now turns clockwise according to the pattern shown in FIG. 10(b). In this case, when the left leg 2L is in the sweeping phase, both the feet 9, 9 are of a pigeon-toed attitude, and when the right leg 2R is in the sweeping phase, both the feet 9, 9 are of an attitude where they are parallel to each other at the basic foot spacing.

The walking action shown in FIG. 10(b) (the turning action of the robot A) takes place similarly as shown in FIG. 10(d) even when the left manipulator lever 26L and the right manipulator lever 26R are shifted to the neutral manipulated position and the rightward rotationally manipulated position, respectively. In this case, however, since the left manipulator lever 26L is shifted to the neutral manipulated position, when the left leg 2L is the free leg (a first step and a third step in FIG. 10(d)), the foot 9 of the left leg 2L is moved to a position parallel to the foot 9 of the right leg 2R at the basic foot spacing. In FIG. 10(d), as the left leg 2L is the free leg in the first step, the robot A does not turn clockwise in the first step. Furthermore, because the right manipulator lever 26L is shifted to the rightward rotationally manipulated position, when the right leg 2R is the free leg (a second step in FIG. 10(d)), the foot 9 of the right leg 2R is turned clockwise with respect to the foot 9 of the left leg 2L, so that both the feet 9, 9 are of a bandy-legged attitude.

When the left manipulator lever 26L and the right manipulator lever 26R are shifted to the rightward rotationally manipulated position and the leftward rotationally manipulated position, respectively, as shown in FIG. 10(c), the ECU 19 generates a desired gait (a current time gait and a next time gait) for two steps in each step for placing the foot 9 of the left leg 2L in a position turned a predetermined angular distance clockwise with respect to the foot 9 of the right leg 2R (this action is the same as the action shown in FIG. 10(a)) when the left leg 2L and the right leg 2R are operated as the free leg and the supporting leg, respectively (see a first step and a third step in FIG. 10(c)), and for placing the foot 9 of the right leg 2R in a position turned a predetermined angular distance counterclockwise with respect to the foot 9 of the left leg 2L (this action corresponds to the right manipulator lever 26R shifted to the leftward rotationally manipulated position) when the left leg 2L and the right leg 2R are operated as the supporting leg and the free leg, respectively (see a second step in FIG. 10(c)). In this case, after the foot 9 of the left free leg 2L is turned clockwise with respect to the foot 9 of the right leg 2R so as to jointly form a pigeon-toed attitude in the first step, the legs 2L, 2R repeat their stepping action while the feet 9, 9 are being kept in their positional and attitudinal relationship in the rotational direction the first step. Therefore, the robot A does not turn.

In this manner, with respect to the rotations of the manipulator levers 26L, 26R, depending on whether the left manipulator lever 26L is shifted to the rightward rotationally, neutral, or leftward rotationally manipulated position, the placed position and attitude in the rotational direction of the foot 9 of the left leg 2L with respect to the foot 9 of the right leg 2R are determined irrespective of the rotationally manipulated position of the right manipulator lever 26R when the left leg 2L is operated as the free leg. Depending on whether the right manipulator lever 26R is shifted to the rightward rotationally, neutral, or leftward rotationally manipulated position, the placed position and attitude in the rotational direction of the foot 9 of the right leg 2R with respect to the foot 9 of the left leg 2L are determined irrespective of the rotationally manipulated position of the left manipulator lever 26L when the right leg 2R is operated as the free leg.

According to any one of the patterns shown in FIGS. 10(a) through 10(d), when both the manipulator levers 26L, 26R are continuously shifted to the same manipulated positions, the actions in the second step and the third step are alternately repeated for fourth and subsequent steps.

As described above, when the manipulation mode of the manipulation unit 23 is set to the basic manipulation mode by the manipulation mode selector switch 29, the robot A basically walks in the fore-and-aft direction, walks in the lateral direction (laterally walks), and turns in response to the manipulator levers 26L, 26R being angularly displaced in the fore-and-aft direction, angularly displaced in the lateral direction, and rotated, respectively.

Specific gait patterns in the case where the manipulation mode of the manipulation unit 23 is set to the simple manipulation mode by the manipulation mode selector switch 29 and the data representing the simple manipulation mode is given from the input/output processing circuit 33 of the manipulation unit 23 through the communication devices 25, 20 to the ECU 19 of the robot A will be described below.

With the manipulation mode of the manipulation unit 23 being set to the simple manipulation mode, the ECU 19 of the robot A does not employ the data about rotations of the manipulator levers 26, of all the data of the manipulation signals given from the manipulation unit 23 through the communication devices 25, 20, and does not take into account rotationally manipulated positions of the manipulator levers 26. The ECU 19 employs only the data about the angular displacements of the manipulator levers 26 in the fore-and-aft direction and the lateral direction, of all the data of the manipulation signals, and determines only manipulated positions of the manipulator levers 26 of the manipulation unit 23 in fore-and-aft direction and the lateral direction, as being classified into one of three types, as with the basic manipulation mode.

Controlling walking actions of the robot A depending on how the manipulator levers 26L, 26R are manipulated in the simple manipulation mode is exactly the same as in the basic manipulation mode when both manipulator levers 26L, 26R are continuously shifted to the neutral manipulated positions and also when both manipulator levers 26L, 26R are continuously angularly displaced in the lateral direction. Specifically, when both manipulator levers 26L, 26R are continuously shifted to the neutral manipulated position, if the leg stopping switch 27 is turned off, then the robot A makes the stepping action shown in FIG. 7, and if the leg stopping switch 27 is turned on, the feet 9, 9 are in the parallel placed state in which they are kept placed at the basic foot spacing. When both manipulator levers 26L, 26R are continuously angularly displaced leftward or rightward, the robot A walks laterally according to the patterns shown in FIGS. 9(a) through 9(d).

In the simple manipulation mode, when the manipulator levers 26R, 26L are angularly displaced in the fore-and-aft direction, the robot A makes walking actions in patterns shown in FIGS. 11(a) through 11(d).

When both the left manipulator lever 26L and the right manipulator lever 26R are shifted to the forward manipulated position, as shown in FIG. 11(a), the ECU 19 generates a desired gait (a current time gait and a next time gait) for two steps in each step in exactly the same pattern as shown in FIG. 8(a) in the basic manipulation mode. The robot A thus walks forward.

When the left manipulator lever 26L and the right manipulator lever 26R are shifted to the forward manipulated position and the neutral manipulated position, respectively, as shown in FIG. 11(b), the ECU 19 generates a desired gait (a current time gait and a next time gait) for two steps in each step for placing the foot 9 of the left leg 2L in a position stepped forward a predetermined distance and turned a predetermined angular distance clockwise with respect to the foot 9 of the right leg 2R when the left leg 2L and the right leg 2R are operated as the free leg and the supporting leg, respectively (see a first step and a third step in FIG. 11(b)), and for placing the foot 9 of the right leg 2R in a position stepped forward a predetermined distance and turned a predetermined angular distance clockwise with respect to the foot 9 of the left leg 2L when the left leg 2L and the right leg 2R are operated as the supporting leg and the free leg, respectively (see a second step in FIG. 11(b)). The robot A now walks forward and turns clockwise according to the pattern shown in FIG. 11(b).

The walking action shown in FIG. 11(b) takes place similarly as shown in FIG. 11(d) even when the left manipulator lever 26L and the right manipulator lever 26R are shifted to the neutral manipulated position and the forward manipulated position, respectively. In this case, however, since the left manipulator lever 26L is shifted to the neutral manipulated position and the right manipulator lever 26R is shifted to the forward manipulated position, in a first step and a third step where the left leg 2L is the free leg, the foot 9 of the left leg 2L is placed in a position stepped forward a predetermined distance and turned a predetermined angular distance counterclockwise with respect to the foot 9 of the right leg 2R, and in a second step where the right leg 2R is the free leg, the foot 9 of the right leg 2R is placed in a position stepped forward a predetermined distance and turned a predetermined angular distance counterclockwise with respect to the foot 9 of the left leg 2L. The robot A now walks forward and turns counterclockwise.

When the left manipulator lever 26L and the right manipulator lever 26R are shifted to the forward manipulated position and the rearward manipulated position, respectively, as shown in FIG. 11(c), the ECU 19 generates a desired gait (a current time gait and a next time gait) for two steps in each step for placing the foot 9 of the left leg 2L in a position turned a predetermined angular distance clockwise with respect to the foot 9 of the right leg 2R when the left leg 2L and the right leg 2R are operated as the free leg and the supporting leg, respectively (see a first step and a third step in FIG. 11(c)), and for placing the foot 9 of the right leg 2R in a position turned a predetermined angular distance clockwise with respect to the foot 9 of the left leg 2L when the left leg 2L and the right leg 2R are operated as the supporting leg and the free leg, respectively (see a second step in FIG. 11(c)). The robot A now turns clockwise while staying in substantially the same position according to the pattern shown in FIG. 11(c).

In the simple manipulation mode, the manipulator levers 26L, 26R of the manipulation unit 23 are angularly moved in the fore-and-aft direction to cause the robot A to walk in the fore-and-aft direction and also in the rotational direction. The manipulator levers 26L, 26R of the manipulation unit 23 are angularly moved in the lateral direction to cause the robot A to walk in the lateral direction (to walk laterally), as in the basic manipulation mode.

In the simple manipulation mode, when the manipulator levers 26L, 26R of the manipulation unit 23 are angularly moved in the fore-and-aft direction, the placed positions and attitudes of the free legs 2L, 2R with respect to those supporting legs are not determined solely based on the manipulated positions of the manipulator levers 26L, 26R, but are determined based on a combination of the manipulated positions of the manipulator levers 26L, 26R in the fore-and-aft direction.

In the present embodiment, in either one of the basic manipulation mode and the simple manipulation mode, when the left leg 2L is placed from its lifted state, except in the parallel placed stated, the placing of the left leg 2L is detected by the ground sensor 12 on the foot 9 of the left leg 2L, and the detected data is given through the ECU 19 and the communication devices 20, 25 to the input/output processing circuit 33 of the manipulation unit 23. At this time, the input/output processing circuit 33 causes the drive circuit 32 to temporarily energize the left indicator lamp 28L of the manipulation unit 23. Similarly, when the right leg 2R is placed from its lifted state, the placing of the right leg 2R is detected by the ground sensor 12 on the foot 9 of the right leg 2R, and the detected data is given to the input/output processing circuit 33. At this time, the input/output processing circuit 33 temporarily energizes the right indicator lamp 28R of the manipulation unit 23. Thus, the placing of the legs 2L, 2R is indicated to the operator by the energization of the corresponding indicator lamps 28L, 28R of the manipulation unit 23.

In the above description, each of the manipulator levers 26 is manipulated in one of the fore-and-aft direction, the lateral direction, and the rotational direction. With the remote controller according to the present embodiment, when each of the manipulator levers 26 is manipulated in a combination of the fore-and-aft direction, the lateral direction, and the rotational direction, the legs 2, 2 of the robot A are operated in a pattern representing a combination of gaits based on the manipulations of the manipulator levers 26 in the fore-and-aft direction, the lateral direction, and the rotational direction.

Figure 12:
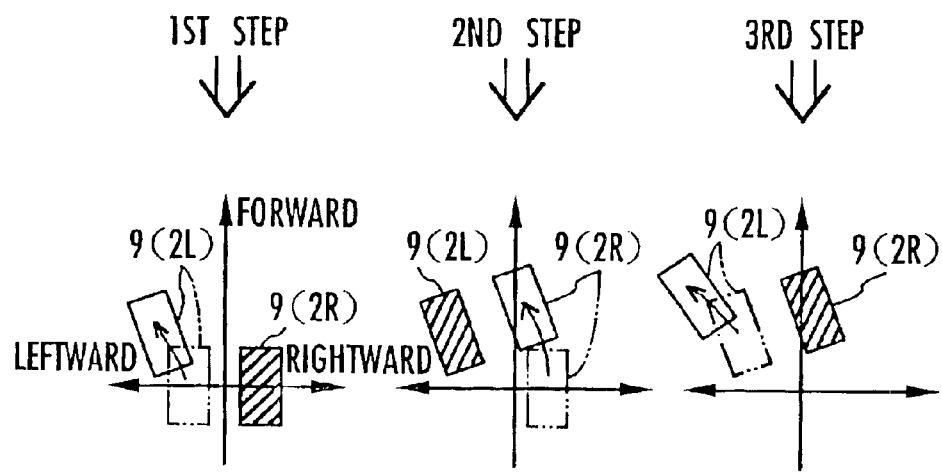

For example, in the basic manipulation mode, when the left manipulator lever 26L is shifted to the forward manipulated position, the leftward manipulated position, and the leftward rotationally manipulated position, and the right manipulator lever 26R is continuously shifted to the neutral manipulated position, the legs 2L, 2R are operated according to a gait shown in FIG. 12. Specifically, the ECU 19 generates a desired gait (a current time gait and a next time gait) in each step for placing the foot 9 of the left leg 2L in a position and an attitude displaced predetermined distances in the forward direction, the leftward direction, and the counterclockwise rotational direction with respect to the foot 9 of the right leg 2R for a first step and a third step where the left leg 2L is the free leg (this action corresponds to the manipulated position of the left manipulator lever 26L), and for placing the foot 9 of the right leg 2R in a position and an attitude parallel to the foot 9 of the left leg 2L at the basic foot spacing in the lateral direction for a second step where the right leg 2R is the free leg (this action corresponds to the manipulated position (neutral manipulated position) of the right manipulator lever 26R).

When each manipulator lever 26 is manipulated in a combined pattern in the fore-and-aft direction, the lateral direction, and the rotational direction in the basic manipulation mode, the gait of the left leg 2L at the time it is the free leg is a combination of the gait corresponding to the manipulated position of the left manipulator lever 26L in the fore-and-aft direction, the gait corresponding to the manipulated position thereof in the lateral direction, and the gait corresponding to the manipulated position thereof in the rotational direction. Likewise, the gait of the right leg 2R at the time it is the free leg is a combination of the gait corresponding to the manipulated position of the right manipulator lever 26R in the fore-and-aft direction, the gait corresponding to the manipulated position thereof in the lateral direction, and the gait corresponding to the manipulated position thereof in the rotational direction.

The gait patterns with respect to the manipulated positions of the manipulator levers 26R, 26L as described above are basic gait patterns which are achieved when the manipulator levers 26R, 26L are kept steadily in the same manipulated positions. In this case, a desired gait (a current time gait and a next time gait) generated by the ECU 19 in each step is also of a steady nature. An example in which the manipulated positions of the manipulator levers 26R, 26L are changed while the robot A is making a steady walking action will be described below with reference to FIG. 13.

Figure 13:
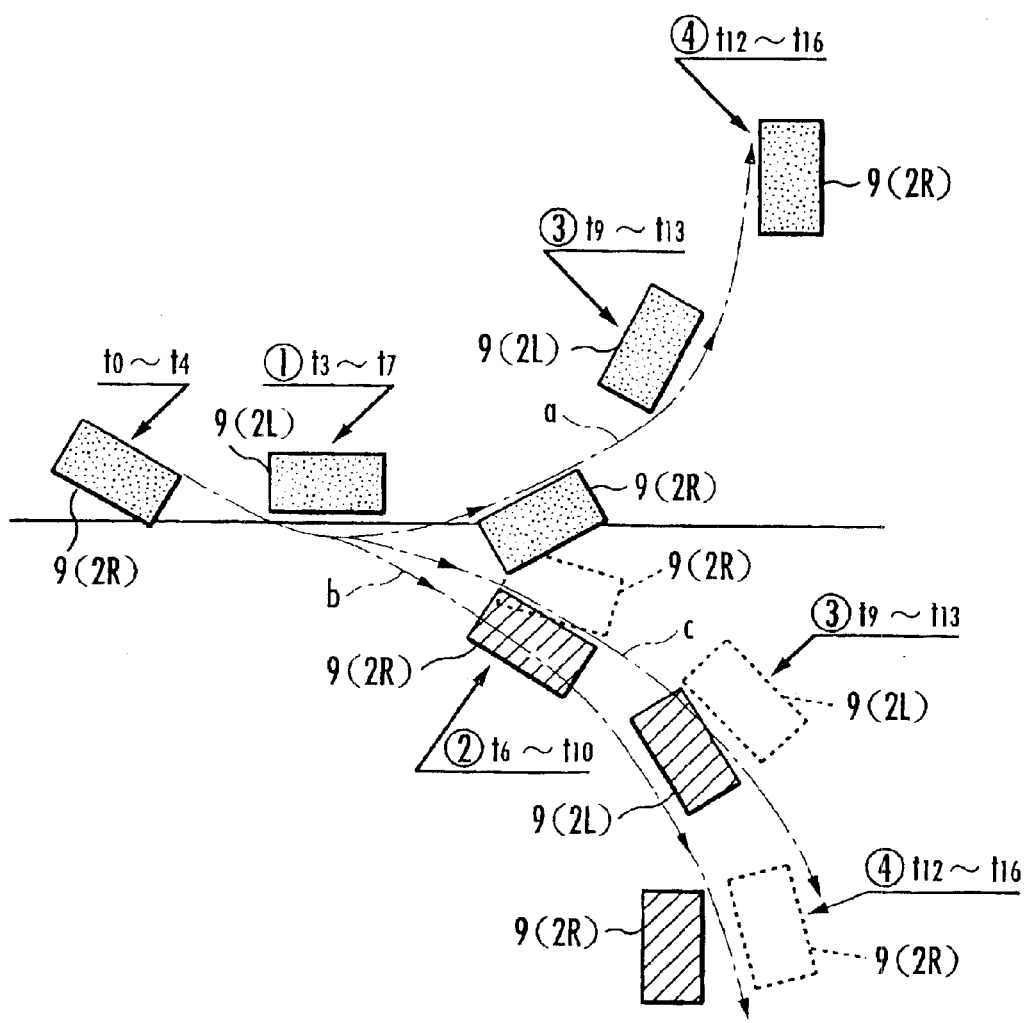

Referring to FIG. 13, feet 9 which are shown stippled represent motions of the feet 9 of the legs 2R, 2L (placed positions and attitudes of the feet 9 of the legs 2R, 2L as they step) when the manipulation mode of the manipulation unit 23 is set to the basic manipulation mode and both the left manipulator lever 26L and the right manipulator lever 26R are continuously shifted to the forward manipulated position and the leftward rotationally manipulated position. FIG. 13 is plotted so as to correspond to FIG. 6, and t0, t1, . . . in FIG. 13 represent the times shown in FIG. 6. Encircled numerals ①–④ correspond to encircled numerals applied to the squiggled cells which represent the periods in which the legs 2R, 2L are placed in FIG. 6. For example, the stippled foot 9 indicated by ① represent the placed position and attitude of the foot 9 of the left leg 2L which is placed in the period t3–t7 in FIG. 6. The other feet 9 shown in FIG. 13 similarly represent other positions and attitudes of the feet.

In the basic manipulation mode, when both the left manipulator lever 26L and the right manipulator lever 26R are continuously shifted to the forward manipulated position and the leftward rotationally manipulated position (hereinafter referred to as "forward/leftward rotationally manipulated position"), the robot A turns (turns counterclockwise) along the dot-and-dash line indicated by the arrow a as represented by the stippled feet 9. In this case, each of a current time gait and a next time gait in each step is maintained as a gait for moving and turning the foot 9 of the free leg 2R or 2L a predetermined distance forward and a predetermined angular distance counterclockwise, respectively, with respect to the foot 9 of the supporting leg 2L or 2R, and then placing the foot 9 of the free leg 2R or 2L.

In FIG. 13, feet 9 which are shown hatched and feet 9 which are shown by broken lines represent gaits where both the left manipulator lever 26L and the right manipulator lever 26R are changed from the forward/leftward rotationally manipulated position to the forward manipulated position and the rightward rotationally manipulated position (hereinafter referred to as "forward/rightward rotationally manipulated position") in the period t0–t4 in which the foot 9 of the 1 ft leg 2L is placed, and thereafter remain shifted to the forward/rightward rotationally manipulated position, as with the feet 9 which are shown stippled. The forward/rightward rotationally manipulated position is a manipulated position for turning the robot A clockwise, opposite to the turning motion of the feet 9 shown stippled. The feet 9 shown hatched represent foot motions when the manipulated positions of both the manipulator levers 26L, 26R are changed from the forward/leftward rotationally manipulated position to the forward/rightward rotationally manipulated position immediately prior to the time t1, for example, and the feet 9 shown by broken lines represent foot motions when the manipulated positions of both the manipulator levers 26L, 26R are changed from the forward/leftward rotationally manipulated position to the forward/rightward rotationally manipulated position at the time t3, for example.

Foot motions when the manipulated positions of both the manipulator levers 26L, 26R are changed immediately prior to the time t1will first be described below. In this case, the ECU 19 attempts to correct the current time gait (the gait with the left free leg 2L) and the next time gait (the gait with the right free leg 2R) at the time when the manipulated positions of both the manipulator levers 26L, 26R are changed, according to the control sequence of the flowchart shown in FIG. 5. The current time gait at the time when the manipulated positions of both the manipulator levers 26L, 26R are changed is a gait (which is in conformity with the next time gait immediately prior to the time t0) for moving the foot 9 of the left leg 2L to the position and attitude at ① in FIG. 13 at the time t3 in order to turn the robot A counterclockwise. The time when the manipulated positions of both the manipulator levers 26L, 26R are changed represents a state immediately before the left leg 2L is about to step toward the stippled position and attitude at ① while moving the center of gravity of the robot A leftward, in order to turn the robot A counterclockwise. Therefore, if the current time gait at the time when the manipulated positions of both the manipulator levers 26L, 26R are changed is changed to a gait corresponding to the forward/rightward rotationally manipulated position which is a new manipulated position, then the center of gravity of the robot A moves excessively, tending to bring the attitude of the robot A out of balance. In this case, consequently, the ECU 19 does not substantially correct the current time gait, but keeps the current time gait (a gait corresponding to the forward/leftward rotationally manipulated position. As a result, in the period t3–t7, the placed position and attitude of the right leg 2R which is placed become the same position and attitude (the stippled position and attitude at ①) as when the manipulated position is the forward/leftward rotationally manipulated position.

In the above example, the ECU 19 does not correct the current time gait because the manipulated positions are changed from the forward/leftward rotationally manipulated position to the forward/rightward rotationally manipulated position immediately prior to the time t1. However, if the manipulated positions are changed to the forward/rightward rotationally manipulated position immediately after the time t0, the ECU 19 corrects the current time gait depending on the changed manipulated position insofar as the stability of the attitude of the robot A can be maintained. For example, the ECU 19 corrects the current time gait for correcting the placed position and attitude of the foot 9 of the left leg 2L at the time t3 so as to be slightly rightward (downward in FIG. 13) from the stippled foot 9 at ① in FIG. 13 with respect to the direction in which the robot A moves forward.

The next time gait at the time when the manipulated positions are changed (within the period t0–t1) is a gait for moving the foot 9 of the right leg 2R to the stippled position and attitude at ② in FIG. 13 after the foot 9 of the left leg 2L has been moved according to the current time gait in order to turn the robot A counterclockwise. The time when the manipulated positions are changed in this case is a timing before the foot 9 of the left leg 2L to be placed in the position ① in FIG. 13 according to the current time gait steps forward. Therefore, even if the next time gait at the time when the manipulated positions are changed is changed to a gait corresponding to the forward/rightward rotationally manipulated position which is a new manipulated position, it is possible to maintain the stability of the attitude of the robot A with a margin. In this case, therefore, the ECU 19 corrects the next time gait into a gait corresponding to the forward/rightward rotationally manipulated position which is a new manipulated position. The next time gait corresponding to the forward/rightward rotationally manipulated position represents a position and attitude (the hatched position and attitude at ② in FIG. 13) where the foot 9 of the right leg 2R has been moved a predetermined distance forward and turned a predetermined angular distance clockwise with respect to the foot 9 of the left leg 2L which is placed in the period t3–t7. This next time gait directly becomes the current time gait at ht time t3 (when the left leg 2L starts to be placed). As a result, the foot 9 of the left leg 2L which is to be placed in the period t6–t10 is placed at the hatched position and attitude at ② in FIG. 13.

Thereafter, since the manipulated positions of the manipulator levers 26L, 26R are kept as the forward/rightward rotationally manipulated position, each of a current time gait and a next time gait in each step is maintained as a gait for moving and turning the foot 9 of the free leg 2R or 2L a predetermined distance forward and a predetermined angular distance clockwise, respectively, with respect to the foot 9 of the supporting leg 2L or 2R, and then placing the foot 9 of the free leg 2R or 2L (see the hatched feet 9 at ③, ④ in FIG. 13).

Therefore, when the manipulated positions of the manipulator levers 26L, 26R are changed as described above in the period t0–t1, the robot A moves along the dot-and-dash line b in FIG. 13.

When the manipulated positions of the manipulator levers 26L, 26R are changed from the forward/leftward rotationally manipulated position to the forward/rightward rotationally manipulated position at the time t3, the current time gait at the time when the manipulated positions are changed (when the foot 9 of the right leg 2R starts to be placed in the position ① in FIG. 13) becomes a next time gait generated immediately prior to that time according to the control sequence of the flowchart shown in FIG. 5. Therefore, at the time when the manipulated positions are changed, the current time gait becomes a gait for placing the foot 9 of the left leg 2L at the stippled position and attitude at ② in FIG. 13. The ECU 19 then attempts to correct the current time gait depending on the forward/rightward rotationally manipulated position which is a new manipulated position in the period t3–t4.

The time when the manipulated positions are changed is a time at which the left leg 2L starts to be placed at the position and attitude at ① in FIG. 13, and a time immediately before the right leg 2R to be the free leg next time starts being lifted. Therefore, the center of gravity of the robot A can somewhat be moved to allow the robot A to turn clockwise. However, if the foot 9 of the right leg 2R is to be placed at an intrinsic position and attitude corresponding to the forward/rightward rotationally manipulated position according to the current time gait, then the stability of the attitude of the robot A tends to be impaired. In this case, the ECU 19 generates, in the period t3–t4, a placed position and attitude at the current time gait for the foot 9 of the right leg 2R so as to be closer to the placed position and attitude (the stippled position and attitude ② in FIG. 13) at the current time gait for the foot 9 of the right leg 2R at the time when the manipulated positions are changed, than the intrinsic position and attitude corresponding to the forward/rightward rotationally manipulated position. For example, the ECU 19 corrects the current time gait to equalize the placed position and attitude of the right leg 2R which is to be placed in the period t6–t10, to the broken-line position and attitude at ② in FIG. 13. Specifically, the ECU 19 generates a current time gait for turning and moving the foot 9 of the right leg 2R with respect to the foot 9 of the left leg 2L (indicated at ①) by an angular distance smaller than an intrinsic predetermined angular distance corresponding to the forward/rightward rotationally manipulated position, and by a predetermined distance forward, respectively, and then placing the foot 9 of the right leg 2R.

In this case, since the time when the manipulated positions are changed is the time t3 (the time to start the two-leg support period), the ECU 19 generates a next time gait so as to correspond to the new manipulated position (the forward/rightward rotationally manipulated position). Specifically, the ECU 19 generates a next time gait for moving and turning the foot 9 of the left leg 2L to be placed in the period t9–t13 by a predetermined distance forward and by a predetermined angular distance clockwise, respectively, with respect to the foot 9 of the right leg 2R to be placed in the period t6–t10, and then placing the foot 9 of the left leg 2L. Because the current time gait at time when the manipulated positions are changed is a gait for placing the right leg 2R in the stippled position and attitude at ②, the next time gait at time when the manipulated positions are changed becomes a gait for placing the left leg 2L in the stippled position and attitude at ③ in FIG. 13. When the current time gait is corrected into the gait for placing the right leg 2R in the broken-line position and attitude at ② in FIG. 13, the next time gait is corrected into the gait for placing the left leg 2L in the broken-line position and attitude at ③ in FIG. 13.

Thereafter, since the manipulated positions of the manipulator levers 26L, 26R are kept as the forward/rightward rotationally manipulated position, each of a current time gait and a next time gait in each step is maintained as a gait for moving and turning the foot 9 of the free leg 2R or 2L a predetermined distance forward and a predetermined angular distance clockwise, respectively, with respect to the foot 9 of the supporting leg 2L or 2R, and then placing the foot 9 of the free leg 2R or 2L (see the hatched foot 9 at ④ in FIG. 13).

Consequently, when the manipulated positions of the manipulator levers 26L, 26R are changed, the robot A moves along the dot-and-dash line c in FIG. 13.

The changing of the gaits as described above with reference to FIG. 13 is also carried out similarly when the manipulation mode of the manipulation unit 23 is set to the simple manipulation mode.

With the remote controller according to the present embodiment, the robot A can be controlled to walk in the fore-and-aft direction, the lateral direction, and the rotational direction by simple manipulations of the manipulation unit 23.

In the basic manipulation mode, since a pattern of walking actions for two steps can be given to the ECU 19 by the manipulated positions of the manipulator levers 26L, 26R, the ECU 19 can generate a desired gait for two steps which matches the manipulated positions of the manipulator levers 26L, 26R. Specifically, depending on which manipulated position the left manipulator lever 26L is shifted to, the placed position and attitude of the foot 9 of the left leg 2L with respect to the foot 9 of the right leg 2R are determined irrespective of the manipulated position of the right manipulator lever 26R when the left leg 2L is operated as the free leg. Depending on which manipulated position the right manipulator lever 26R is shifted to, the placed position and attitude of the foot 9 of the right leg 2R with respect to the foot 9 of the left leg 2L are determined irrespective of the manipulated position of the left manipulator lever 26L when the right leg 2R is operated as the free leg. Therefore, the manipulated positions of the manipulator levers 26L, 26R are independently indicative of indicating a gait for each step. Consequently, a current time gait and a next time gait, which are a desired gait for two steps, can be generated so as to match the manipulated positions of the manipulator levers 26L, 26R. As a result, the matching between the manipulated positions of the manipulator levers 26L, 26R of the manipulation unit 23 and the actual walking action of the robot A is increased, thus increasing the manipulability of the robot A.

By generating a desired gait for two steps (a current time gait and a next time gait), the desired gait can be generated such that the center of gravity of the robot A is present at a position for maintaining a stable attitude of the robot A, allowing the robot A to walk at a stable attitude. By generating a desired gait for two steps, furthermore, the operator may basically determine a walking pattern for the robot A and hence manipulated positions for the manipulation levers 26 for each two-step motion. Therefore, the operator can sufficiently control a walking action of the robot A, and hence easily control a walking action of the robot A.

Since the placing of the legs 2L, 2R is indicated by the corresponding indicator lamps 28L, 28R, the operator can operate the manipulator levers 26L, 26R at a timing which matches an actual motion of the robot A, and hence can operate the manipulation unit 23 well.

With the manipulator levers 26L, 26R being shifted to the neutral manipulated position, the legs 2, 2 can be brought into the parallel placed state and their actions can be stopped by turning on the leg stopping switch 27. Consequently, the electric energy stored in the electric energy storage device 17 mounted on the robot A is prevented from being unduly wasted. In the parallel placed state, the leg stopping switch 27 may be turned off to cause the legs 2, 2 to make a stepping action as required.

Furthermore, inasmuch as the types of patterns of walking actions of the robot A depending on the operation of the manipulator levers 26, 26 can be changed by the manipulation mode selector switch 29 of the manipulation unit 23, the operator can manipulate the robot A in a pattern which matches the operator's preferences.

A remote controller for a biped robot according to a second embodiment of the present invention will be described below. The remote controller according to the second embodiment is structurally identical to the remote controller according to the first embodiment, but differs therefrom only with respect to a portion of the control process of the ECU 19. Structural parts of the remote controller are denoted by reference characters which are identical to those shown in FIGS. 1 through 4, and will not be described below.

According to the present embodiment, when the manipulation mode of the manipulation unit 23 is set to the basic manipulation mode, as with the first embodiment, the ECU 19 of the robot A not only determines each of the manipulated position in the fore-and-aft direction, the manipulated position in the lateral direction, and the manipulated position about the vertical axes of each of the manipulator levers 26 of the manipulation unit 23, as being classified into one of three types, based on the data of the manipulation signals that are given from the manipulation unit 23, but also monitors forward angular displacements, rearward angular displacements, rightward angular displacements, and leftward angular displacements of the manipulator levers 26 from the neutral manipulated position in the forward manipulated position, the rearward manipulated position, the rightward manipulated position, and the leftward manipulated position. The ECU 19 also monitors clockwise rotational displacements and counterclockwise rotational displacements of the manipulator levers 26 from the neutral manipulated position in the rightward rotationally manipulated position and the leftward rotationally manipulated position of the manipulator levers 26 (the angular displacements and the rotational displacements will hereinafter be referred to collectively as "manipulated displacements").

According to the present embodiment, the robot A is controlled to make a walking action in the fore-and-aft direction when the manipulator levers 26, 26 are shifted in the fore-and-aft direction, the robot A is controlled to make a walking action in the lateral direction when the manipulator levers 26, 26 are shifted in the lateral direction, and the robot A is controlled to make a turn when the manipulator levers 26, 26 are rotated, as with the first embodiment. The basic process (the processing sequence of the flowchart shown in FIG. 5) for generating and correcting a current time gait and a next time gait is also the same as with the first embodiment. In each of the walking actions, the displacement of the robot A in each step (the displacement of the foot 9 of the free leg 2R or 2L in each of the current time gait and the next time gait is adjusted depending on the manipulated displacements of the manipulator levers 26. The legs 2, 2 move in the same manner as with the first embodiment while the manipulator levers 26 are shifted to the neutral manipulated position. Specifically, when the leg stopping switch 27 is turned off, the legs 2, 2 make a stepping action as shown in FIG. 7, and when the leg stopping switch 27 is turned on, the legs 2, 2 stop their stepping action, and are brought into the parallel placed state.

Specific examples of walking actions of the robot A according to the present embodiment, particularly walking actions of the robot A when the manipulator levers 26, 26 are angularly moved in the fore-and-aft direction, will be described below with reference to FIGS. 14(a) through 14(d). FIGS. 14(a) through 14(d) schematically show motions of the feet 9 chronologically successively from the left of the figures for first through third steps of the legs 2, 2 when the manipulator levers 26R, 26L are manipulated into the illustrated manipulated positions and kept in the manipulated positions while the legs 2, 2 have been parallel to each other in the lateral direction and stepping in the same position or have been in the parallel placed state, as with the examples shown in FIGS. 8(a)–8(d) through 10(a)–10(d).

FIG. 14(a) shows a gait of a walking action of the robot A where both the left manipulator lever 26L and the right manipulator lever 26R are shifted to the forward manipulated position and kept in the forward manipulated position. In FIG. 14(a), the feet 9, 9 indicated by the broken lines represent positions corresponding to the manipulator levers 26R, 26L as they are angularly moved forward by a maximum manipulated displacement, and the feet 9, 9 indicated by the solid lines represent positions corresponding to the manipulator levers 26R, 26L as they are angularly moved forward by a manipulated displacement which is about half the maximum manipulated displacement.

When both the left manipulator lever 26L and the right manipulator lever 26R are shifted to the forward manipulated position, as shown in FIG. 14(a), the ECU 19 basically generates a desired gait (a current time gait and a next time gait) for two steps in each step for placing the foot 9 of the left leg 2L in a position stepped forward from the foot 9 of the right leg 2R when the left leg 2L and the right leg 2R are operated as the free leg and the supporting leg, respectively (see a first step and a third step in FIG. 14(a)), and for placing the foot 9 of the right leg 2R in a position stepped forward from the foot 9 of the left leg 2L when the left leg 2L and the right leg 2R are operated as the supporting leg and the free leg, respectively (see a second step in FIG. 14(a)), in the same manner as shown in FIG. 8(a) for the first embodiment.

According to the present embodiment, however, for operating the left leg 2L as the free leg, the ECU 19 generates a desired gait for setting a forward displacement of the foot 9 of the left leg 2L with respect to the foot 9 of the right leg 2R depending on a forward manipulated displacement of the left manipulator lever 26L such that the forward displacement of the foot 9 of the left leg 2L is greater as the forward manipulated displacement is greater. Similarly, for operating the right leg 2R as the free leg, the ECU 19 generates a desired gait for setting a forward displacement of the foot 9 of the right leg 2R with respect to the foot 9 of the left leg 2L depending on a forward manipulated displacement of the right manipulator lever 26R such that the forward displacement of the foot 9 of the right leg 2R is greater as the forward manipulated displacement is greater. As a result, when both the manipulator levers 26L, 26R are angularly moved forward by a maximum manipulated displacement, the robot A walks forward a greatest stride as indicated by the broken lines in FIG. 14(a), and when both the manipulator levers 26L, 26R are angularly moved forward by a manipulated displacement smaller than the maximum manipulated displacement, the robot A walks forward a stride smaller than the greatest stride as indicated by the solid lines in FIG. 14(a).

FIG. 14(b) shows a gait of a walking action of the robot A where the left manipulator lever 26L and the right manipulator lever 26R are shifted to the forward manipulated position and the neutral manipulated position, respectively. In FIG. 14(b), the feet 9, 9 indicated by the broken lines represent positions corresponding to the left manipulator lever 26L as it is angularly moved forward by a maximum manipulated displacement, and the feet 9, 9 indicated by the solid lines represent positions corresponding to the left manipulator lever 26L as it is angularly moved forward by a manipulated displacement which is about half the maximum manipulated displacement.

When the left manipulator lever 26L and the right manipulator lever 26R are shifted to the forward manipulated position and the neutral manipulated position, respectively, as shown in FIG. 14(b), the ECU 19 basically generates a desired gait (a current time gait and a next time gait) for two steps in each step for placing the foot 9 of the left leg 2L in a position stepped forward from the foot 9 of the right leg 2R (this action is the same as the action in FIG. 14(a)) when the left leg 2L and the right leg 2R are operated as the free leg and the supporting leg, respectively (see a first step and a third step in FIG. 14(b)), and for placing the foot 9 of the right leg 2R in a position parallel to the foot 9 of the left leg 2L at the basic foot spacing in the lateral direction when the left leg 2L and the right leg 2R are operated as the supporting leg and the free leg, respectively (see a second step in FIG. 14(b)), in the same manner as shown in FIG. 8(b) for the first embodiment.

According to the present embodiment, however, for operating the left free leg 2L, the ECU 19 generates a desired gait for setting a forward displacement of the foot 9 of the left leg 2L with respect to the foot 9 of the right leg 2R depending on a forward manipulated displacement of the left manipulator lever 26L such that the forward displacement of the foot 9 of the left leg 2L is greater as the forward manipulated displacement is greater. As a result, when the left manipulator lever 26L is shifted to the neutral manipulated position and the right manipulator lever 26R is angularly moved forward by a maximum manipulated displacement, the robot A walks forward a large stride at the time the left leg 2L is the free leg, as indicated by the broken lines in FIG. 14(b), and when the left manipulator lever 26L is angularly moved forward by a manipulated displacement smaller than the maximum manipulated displacement, the robot A walks forward a stride smaller than indicated by the broken lines at the time the left leg 2L is the free leg, as indicated by the solid lines in FIG. 14(b).

The walking action shown in FIG. 14(b) takes place similarly as shown in FIG. 14(d) even when the left manipulator lever 26L and the right manipulator lever 26R are shifted to the neutral manipulated position and the forward manipulated position, respectively. FIG. 14(d) shows a gait of a walking action of the robot A where the left manipulator lever 26L and the right manipulator lever 26R are shifted to the neutral manipulated position and the forward manipulated position, respectively. In FIG. 14(d), the feet 9, 9 indicated by the broken lines represent positions corresponding to the right manipulator lever 26R as it is angularly moved forward by a maximum manipulated displacement, and the feet 9, 9 indicated by the solid lines represent positions corresponding to the right manipulator lever 26R as it is angularly moved forward by a manipulated displacement which is about half the maximum manipulated displacement.

In this case, however, since the left manipulator lever 26L is shifted to the neutral manipulated position, when the left leg 2L is the free leg (a first step and a third step in FIG. 14(d)), the foot 9 of the left leg 2L is moved to a position parallel to the foot 9 of the right leg 2R at the basic foot spacing in the lateral direction. When the right leg 2R is the free leg (a second step in FIG. 14(d)), the foot 9 of the right leg 2R is moved forward a displacement depending on the forward manipulated displacement of the right manipulator, lever 26R. In FIG. 14(d), as the left leg 2L is the free leg in the first step, the robot A does not move forward in the first step.

FIG. 14(c) shows a gait of a walking action of the robot A where the left manipulator lever 26L and the right manipulator lever 26R are shifted to the forward manipulated position and the rearward manipulated position, respectively. In FIG. 14(c), the feet 9, 9 indicated by the broken lines represent positions corresponding to the left manipulator lever 26L and the right manipulator lever 26R as they are angularly moved forward and rearward, respectively, by a maximum manipulated displacement, and the feet 9, 9 indicated by the solid lines represent positions corresponding to the left manipulator lever 26L as it is angularly moved forward by a manipulated displacement which is about half the maximum manipulated displacement and the right manipulator lever 26R as it is angularly moved rearward by a manipulated displacement which is about half the maximum manipulated displacement.

When the left manipulator lever 26L and the right manipulator lever 26R are shifted to the forward manipulated position and the rearward manipulated position, respectively, as shown in FIG. 14(c), the ECU 19 basically generates a desired gait (a current time gait and a next time gait) for two steps in each step for placing the foot 9 of the left leg 2L in a position stepped forward from the foot 9 of the right leg 2R (this action is the same as the action in FIG. 14(a)) when the left leg 2L and the right leg 2R are operated as the free leg and the supporting leg, respectively (see a first step and a third step in FIG. 14(c)), and for placing the foot 9 of the right leg 2R in a position stepped rearward from the foot 9 of the left leg 2L when the left leg 2L and the right leg 2R are operated as the supporting leg and the free leg, respectively (see a second step in FIG. 14(c)), in the same manner as shown in FIG. 8(c) for the first embodiment.

According to the present embodiment, however, for operating the left leg 2L as the free leg, the ECU 19 generates a desired gait for setting a forward displacement of the foot 9 of the left leg 2L with respect to the foot 9 of the right leg 2R depending on a forward manipulated displacement of the left manipulator lever 26L such that the forward displacement of the foot 9 of the left leg 2L is greater as the forward manipulated displacement is greater. Similarly, for operating the right leg 2R as the free leg, the ECU 19 generates a desired gait for setting a rearward displacement of the foot 9 of the right leg 2R with respect to the foot 9 of the left leg 2L depending on a rearward manipulated displacement of the right manipulator lever 26R such that the rearward displacement of the foot 9 of the right leg 2R is greater as the rearward manipulated displacement is greater. As a result, when the left manipulator lever 26L and the right manipulator lever 26R are angularly moved to the forward manipulated position and the rearward manipulated position, respectively, by a maximum angular displacement, the foot 9 of the left free leg 2L is stepped forward relatively greatly in the first step, and thereafter the legs 2L, 2R repeat their stepping action while maintaining the positions and attitudes in the fore-and-aft direction of the feet 9, 9 of the first step, as indicated by the broken lines in FIG. 14(c). When the left manipulator lever 26L and the right manipulator lever 26R are angularly moved to the forward manipulated position and the rearward manipulated position, respectively, by similar angular displacements which are smaller than the maximum angular displacement, the foot 9 of the left free leg is stepped forward a stride smaller than indicated by the broken lines in the first step, and thereafter the legs 2L, 2R repeat their stepping action while maintaining the positions and attitudes in the fore-and-aft direction of the feet 9, 9 of the first step, as indicated by the solid lines in FIG. 14(c).

In this manner, with respect to the angular manipulation of the manipulator levers 26L, 26R in the fore-and-aft direction, depending on whether the left manipulator lever 26L is shifted to the forward, neutral, or rearward manipulated position, the placed attitude in the fore-and-aft direction of the foot 9 of the left leg 2L with respect to the foot 9 of the right leg 2R is determined when the left leg 2L is operated as the free leg, and depending on the manipulated displacement of the left manipulator lever 26L, the placed position in the fore-and-aft direction of the foot 9 of the left leg 2L with respect to the foot 9 of the right leg 2R (the displacement in the fore-and-aft direction of the foot 9 of the left leg 2L) is determined. Furthermore, depending on whether the right manipulator lever 26R is shifted to the forward, neutral, or rearward manipulated position, the placed attitude in the fore-and-aft direction of the foot 9 of the right leg 2R with respect to the foot 9 of the left leg 2L is determined when the right leg 2R is operated as the free leg, and depending on the manipulated displacement of the right manipulator lever 26R, the placed position in the fore-and-aft direction of the foot 9 of the right leg 2R with respect to the foot 9 of the left leg 2L (the displacement in the fore-and-aft direction of the foot 9 of the right leg 2R) is determined.

The above motion control of the legs 2, 2 is carried out similarly with respect to the angular shifting in the lateral direction and the rotational shifting of the manipulator levers 26L, 26R of the manipulation unit 23. Specifically, with respect to the angular shifting in the lateral direction of the manipulator levers 26L, 26R, basic gait patterns of the legs 2L, 2R are the same as those shown in FIGS. 9(a) through 9(d). At this time, the displacement in the lateral direction of the foot 9 of the left leg 2L with respect to the foot 9 of the right leg 2R when the left free leg 2L is adjusted depending on the manipulated displacement of the left manipulator lever 26L (the displacement of the foot 9 of the left leg 2L is greater as the manipulated displacement is greater). The displacement in the lateral direction of the foot 9 of the right leg 2R with respect to the foot 9 of the left leg 2L when the right free leg 2R is adjusted depending on the manipulated displacement of the right manipulator lever 26R (the displacement of the foot 9 of the right leg 2R is greater as the manipulated displacement is greater).

With respect to the rotational shifting of the manipulator levers 26L, 26R, basic gait patterns of the legs 2L, 2R are the same as those shown in FIGS. 10(a) through 10(d). At this time, the displacement in the rotational direction of the foot 9 of the left leg 2L with respect to the foot 9 of the right leg 2R when the left free leg 2L is adjusted depending on the manipulated displacement of the left manipulator lever 26L (the displacement of the foot 9 of the left leg 2L is greater as the manipulated displacement is greater). The displacement in the rotational direction of the foot 9 of the right leg 2R with respect to the foot 9 of the left leg 2L when the right free leg 2R is adjusted depending on the manipulated displacement of the right manipulator lever 26R (the displacement of the foot 9 of the right leg 2R is greater as the manipulated displacement is greater).

A current time gait and a next time gait that are generated in each step are appropriately corrected as with the first embodiment. Specifically, when the manipulated positions of the manipulator levers 26L, 26R are changed, while taking into account the current time gait and the next time gait which are generated at the time, the current time gait and the next time gait are appropriately corrected depending on the manipulated positions of the manipulator levers 26L, 26R in order to maintain the stability of the attitude of the robot A. For example, as described above with reference to FIG. 13, when the manipulated positions of the manipulator levers 26L, 26R are changed in the basic manipulation mode, the gait is changed according to the pattern shown in FIG. 13. The displacements (including the angular displacements) of the feet 9 in each step depend on the manipulated displacements of the manipulator levers 26L, 26R as described above.

The remote controller according to the present embodiment offers the same advantages as those of the first embodiment, and is further capable of adjusting the displacement (the displacement per step) of the foot 9 of each leg 2 by adjusting the manipulated displacement of each manipulator lever 26, so that the manipulability of the robot A based on the operation of the manipulation unit 23 can be increased.

In the first and second embodiments described above, the robot A is controlled to make a walking action in the fore-and-aft direction, a walking action in the lateral direction, and a turn when the common manipulator levers 26, 26 are operated. However, the remote controller may have manipulator levers assigned respectively to walking actions in respective directions. Each of the manipulator levers assigned respectively to walking actions in respective directions is not limited to a joystick-shaped manipulator lever, but may be a dial-type manipulator or a manipulator of another type.

In the first and second embodiments, when both the manipulator levers 26, 26 are shifted to the neutral manipulated position, the feet 9, 9 of the legs 2, 2 are made parallel to each other in the lateral direction at a fixed interval (the basic foot spacing). However, the positional or attitudinal relationship between the feet 9, 9 such as the interval between the feet 9, 9 may be changed by operating a switch on the manipulation unit 23.

In the first and second embodiments, a desired gait for two steps is generated in each step of a walking action of the robot A. However, a desired gait for three or more steps may be generated.

In the second embodiment, the displacement (stride) of each step of the robot A is adjusted depending on the manipulated displacements of the manipulator levers 26 only in the basic manipulation mode. However, the displacement of the robot A may be adjusted depending on the manipulated displacements of the manipulator levers 26 in the simple manipulation mode.

In the second embodiment, the displacement of each step of the robot A is adjusted depending on the manipulated displacements of the manipulator levers 26. However, the moving speed of the robot A may be adjusted depending on the manipulated displacements of the manipulator levers 26. In such a case, the period of a clock which determines the timings of lifting and placing of the legs 2 may be adjusted depending on the manipulated displacements of the manipulator levers 26 of the manipulation unit 23. Specifically, with respect to a walking action of the robot A in the fore-and-aft direction, a basic pattern of the walking action of the robot A depending on the manipulated positions of the manipulation unit 23 (either the forward, neutral, or rearward manipulated position) is identical to the basic pattern in the basic manipulation mode according to the first embodiment, and depending on the manipulated displacement of each manipulator lever 26 in the fore-and-aft direction, the period in which the free leg 2 corresponding to that manipulator lever 26 may be adjusted. Such an adjustment may similarly be adjusted with respect to walking actions of the robot A in the lateral direction and the rotational direction.

In the second embodiment, the displacement of each step of the robot A is adjusted depending on the manipulated displacements of the manipulator levers 26. However, the displacement or moving speed of the robot A may be adjusted depending on a rate of change (a time-dependent rate of change) of the manipulated displacements of the manipulator levers 26. For example, a differential means for differentiating the manipulation signals of the manipulation detectors 31R, 31L may be provided on the manipulation unit 23 or the robot A, and a rate of change of the manipulated displacements of the manipulator levers 26 is detected from an output of the differential means. The displacement (stride) or moving speed of the robot A is adjusted depending on the detected rate of change (for example, the displacement or moving speed is increased as the rate of change is greater).

In the first and second embodiments, the placing of the legs 2 is visually indicated by the indicating lamps 28. However, the placing of the legs 2 may be audibly indicated or indicated by vibrations of the manipulation unit 23. The placing of the legs 2 may be indicated as by the indicating lamps 28 only when either one of the legs 2L, 2R is placed.

In the first and second embodiments, the robot A and the remote controller 22 communicate with each other through a wireless link. However, the robot A and the remote controller 22 may communicate with each other through a wired link. The function of the control means according to the present invention is performed by the ECU 19 on the robot A. However, the function of the control means may be performed by a processing device or the like which is provided outside of the robot A.

In the first and second embodiments, when the leg stopping switch 27 of the manipulation unit 23 is turned on while the manipulator levers 26, 26 are in the neutral manipulated position, the stepping action of the legs 2, 2 is stopped, bringing the legs 2, 2 into the parallel placed state. However, the residual capacity of the electric energy storage device 17 may be detected, and when the detected residual capacity is reduced, the stepping action of the legs 2, 2 may automatically be stopped. Alternatively, a period of time from the time when the manipulator levers 26, 26 are shifted to the neutral manipulated position and during which the manipulator levers 26, 26 are kept in the neutral manipulated position may be measured, and when the measured period of time reaches a certain length, the stepping action of the legs 2, 2 may automatically be stopped.

Industrial Applicability

As described above, the present invention is useful as a remote controller for easily manipulating a biped robot which moves with two legs, like a human.

What is claimed is:

1. A remote controller for a biped robot which moves in a walking action by alternately lifting and placing two legs, characterized by comprising a manipulation unit having a manipulator lever shiftable to a plurality of manipulated positions, for outputting a signal representing a manipulated position of the manipulator lever, and control means for being supplied with output signal data from the manipulation unit, generating a motion command for determining motions of the legs for at least two steps of the walking action of the robot depending on the manipulated position of the manipulator lever which is represented by the supplied output signal data, and controlling motions of the legs based on the motion command.

2. A remote controller for a biped robot according to claim 1, characterized in that the motion command for determining motions of the legs for at least two steps represents a desired gait for two steps which comprises a current time gait for determining motions of the legs from a two-leg support period in which both the legs are placed until a next two-leg support period, and a next time gait for determining motions of the legs from the next two-leg support period until a two-leg support period next to the next two-leg support period, and that each time a two-leg support period is reached, said control means obtains a next time gait immediately prior to the two-leg support period as a current time gait, generates a new next time gait depending on the manipulated position of said manipulator lever, and sequentially adjusts at least the new next time gait depending on the manipulated position of the manipulator lever.

3. A remote controller for a biped robot according to claim 1, characterized in that said manipulation unit has manipulator levers associated respectively with the legs of said robot, and said control means generates said motion command for determining a relative placed position and/or attitude of the free leg with respect to the supporting leg, depending on the manipulated position of the manipulator lever which is represented by said output signal data with respect to the manipulator lever corresponding to the free leg in said walking action.

4. A remote controller for a biped robot according to claim 1, characterized in that said plurality of manipulated positions include a movement stopping manipulated position for stopping movement of said biped robot, and said control means selectively generates a motion command for causing said legs to make a stepping action and a motion command for keeping said legs in a placed state, depending on a predetermined condition, when said manipulator lever is shifted to said movement stopping manipulated position.

5. A remote controller for a biped robot according to claim 1, characterized in that said plurality of manipulated positions include a predetermined neutral manipulated position, and said control means comprises means for recognizing a displacement of said manipulator lever from said neutral manipulated position to other one of the manipulated positions and/or a time-dependent rate of change of the displacement, based on the output signal data from said manipulation unit, said control means generating said motion command to adjust a displacement or a moving speed of said biped robot depending on the recognized displacement and/or time-dependent rate of change of the displacement.

6. A remote controller for a biped robot according to claim 1, characterized by placing detecting means for detecting when at least one of the legs is placed from a lifted state and outputting a detected signal to said manipulation unit, said manipulation unit having indicating means for indicating the placing of said at least one of the legs depending on the detected signal.

7. A remote controller for a biped robot according to claim 1, characterized in that said control means is arranged to generate a plurality of different types of said motion commands with respect to at least some of said plurality of manipulated positions, said manipulation unit having manipulation mode designating means for selectively indicating the types of the motion commands to be generated by said control means, to said control means.

* * * * *